(12) United States Patent
Fujimori et al.

(10) Patent No.: US 7,728,994 B2
(45) Date of Patent: Jun. 1, 2010

(54) IMAGE FORMING APPARATUS, CONTROL METHOD THEREFOR, CONTROL PROGRAM AND IMAGE FORMING SYSTEM

(75) Inventors: Takashi Fujimori, Moriya (JP); Hajime Kaji, Abiko (JP); Jun Yamaguchi, Toride (JP); Takashi Nagaya, Moriya (JP)

(73) Assignee: Canon Kabushiki Kaisha (JP)

( * ) Notice: Subject to any disclaimer, the term of this patent is extended or adjusted under 35 U.S.C. 154(b) by 72 days.

(21) Appl. No.: 11/531,505

(22) Filed: Sep. 13, 2006

(65) Prior Publication Data

US 2007/0070383 A1 Mar. 29, 2007

(30) Foreign Application Priority Data

Sep. 14, 2005 (JP) ............................. 2005-266994

(51) Int. Cl.
G06F 3/12 (2006.01)
H04N 1/46 (2006.01)
G03G 15/00 (2006.01)

(52) U.S. Cl. ..................... 358/1.13; 358/504; 399/49

(58) Field of Classification Search ................ 358/1.13, 358/1.15, 504
See application file for complete search history.

(56) References Cited

U.S. PATENT DOCUMENTS

| | | | | | |
|---|---|---|---|---|---|
| 4,962,407 | A | * | 10/1990 | Ueda .......................... 335/208 |
| 5,206,686 | A | * | 4/1993 | Fukui et al. .................... 399/1 |
| 5,296,897 | A | * | 3/1994 | Amemiya et al. .............. 399/39 |
| 6,046,820 | A | * | 4/2000 | Konishi ........................ 358/1.9 |
| 6,943,915 | B1 | * | 9/2005 | Teraue ......................... 358/1.9 |
| 7,188,923 | B2 | * | 3/2007 | Huffman ...................... 347/19 |
| 7,239,413 | B2 | * | 7/2007 | Owen et al. ................. 358/1.15 |
| 7,301,677 | B2 | * | 11/2007 | Oyumi ....................... 358/3.28 |
| 7,587,149 | B2 | * | 9/2009 | Suzuki et al. ................. 399/49 |
| 2002/0010854 | A1 | * | 1/2002 | Ogura et al. ................. 713/100 |
| 2002/0140974 | A1 | * | 10/2002 | Imaizumi et al. ........... 358/1.15 |
| 2002/0141769 | A1 | * | 10/2002 | Phillips ....................... 399/38 |
| 2003/0099007 | A1 | * | 5/2003 | Towner et al. .............. 358/520 |
| 2004/0046985 | A1 | * | 3/2004 | Watanabe et al. ........... 358/1.13 |
| 2004/0081477 | A1 | * | 4/2004 | Maebashi et al. ............. 399/49 |
| 2004/0125161 | A1 | * | 7/2004 | Huffman ...................... 347/14 |
| 2004/0184059 | A1 | * | 9/2004 | Chun et al. ................. 358/1.13 |
| 2004/0196488 | A1 | * | 10/2004 | Tanaka et al. .............. 358/1.14 |
| 2004/0257601 | A1 | * | 12/2004 | Tomiyasu et al. ............ 358/1.9 |
| 2005/0024393 | A1 | * | 2/2005 | Kondo et al. .................. 347/2 |

(Continued)

FOREIGN PATENT DOCUMENTS

JP 2002-326343 A 11/2002

*Primary Examiner*—Mark K Zimmerman
*Assistant Examiner*—Mesfin Getaneh
(74) *Attorney, Agent, or Firm*—Rossi, Kimms & McDowell LLP

(57) ABSTRACT

An image forming apparatus which enables easy management of proofs in a printing process. An image forming apparatus 299 is provided with a reader unit 50, a transfer charger 220, color sensors 274-1 to 274-4, a printer controlling unit 21. The reader unit 50 inputs image data for forming an image on a sheet having an RFID tag 701. The transfer charger 220 generates a transfer image for forming the image on the sheet based on the inputted image data. The color sensors 274-1 to 274-4 measure image formation conditions of the transfer image. The printer controlling unit 21 writes the measured image formation conditions into the RFID tag 701.

10 Claims, 17 Drawing Sheets

U.S. PATENT DOCUMENTS

| | | | |
|---|---|---|---|
| 2005/0029353 A1* | 2/2005 | Isemura et al. | 235/454 |
| 2005/0128519 A1* | 6/2005 | Yamauchi | 358/1.15 |
| 2005/0152706 A1* | 7/2005 | Koie et al. | 399/15 |
| 2005/0162697 A1* | 7/2005 | Kiwada | 358/1.18 |
| 2005/0219561 A1* | 10/2005 | Haikin | 358/1.9 |
| 2005/0264640 A1* | 12/2005 | Kitazawa | 347/171 |
| 2006/0192992 A1* | 8/2006 | Sekiya et al. | 358/1.15 |
| 2007/0058189 A1* | 3/2007 | Yaguchi | 358/1.13 |
| 2007/0133039 A1* | 6/2007 | Yamada | 358/1.14 |
| 2007/0144362 A1* | 6/2007 | Takata et al. | 101/33 |

* cited by examiner

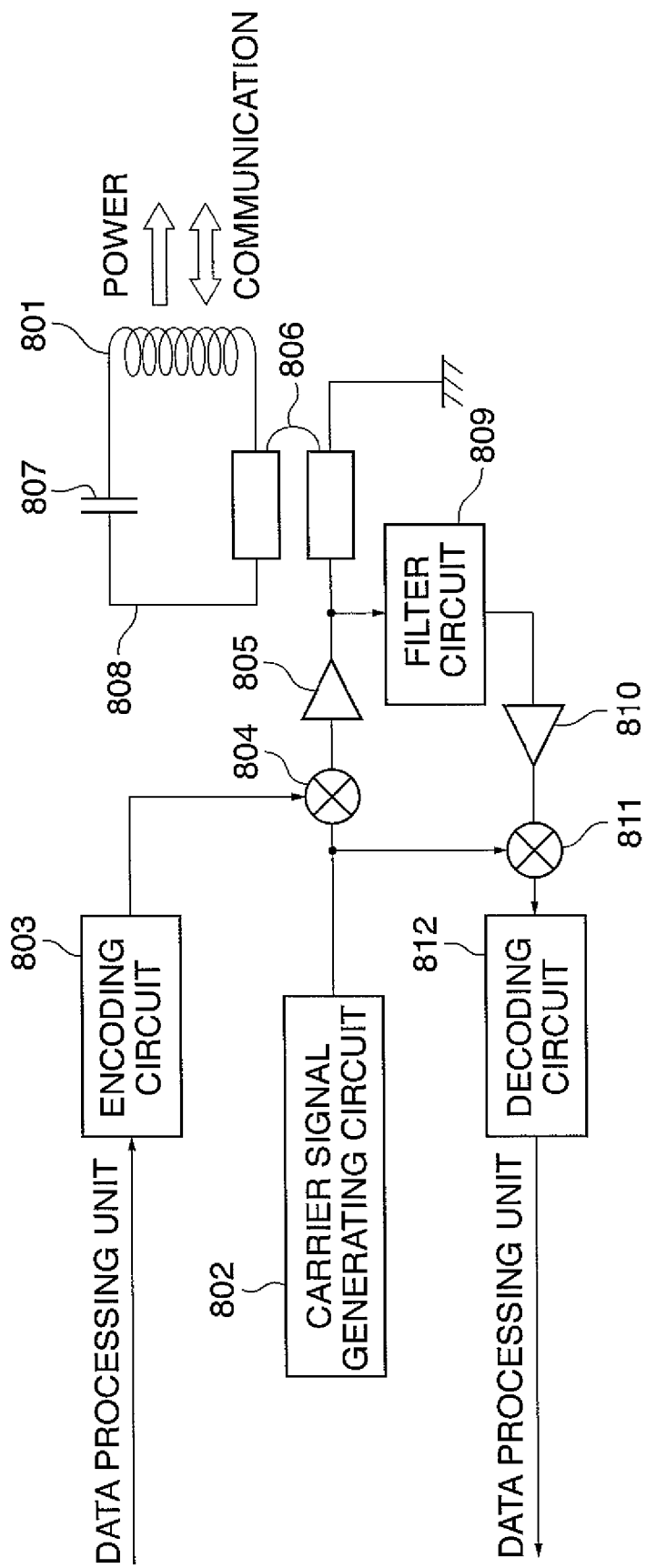

FIG. 9A

| COMMAND | CONTENT OF CONTROLS |
|---|---|
| 0 | READ |
| 1 | WRITE |

| BASIC INFORMATION | PROOF SETTING INFORMATION | |
|---|---|---|
| TAG ID #0 | YELLOW | |
| TAG ID #1 | LASER EMISSION INTENSITY ADJUSTMENT VALUE | |
| TAG ID #2 | CHARGE BIAS ADJUSTMENT VALUE | |
| MANUFACTURER | DEVELOPMENT BIAS ADJUSTMENT VALUE | |
| DATE, MONTH AND YEAR OF MANUFACTURE | TRANSFER BIAS ADJUSTMENT VALUE | |
| SHEET TYPE | LASER WRITING POSITION ADJUSTMENT VALUE (MAIN) | |
| SHEET SIZE | LASER WRITING POSITION ADJUSTMENT VALUE (SUB) | |
| PRINT MODE | DEVICE PROFILE | 00 |
| CONTROLLED TEMPERATURE FOR FIXATION | | 01 |
| FIXING DEVICE TEMPERATURE | | 02 |
| | | 03 |
| | | 04 |
| | | 05 |
| | | ... |
| | | FF |
| | (AMOUNT OF RESIST ADJUSTMENT) | |
| | (AMOUNT OF OUT-OF-COLOR-REGISTRATION ADJUSTMENT) | |

FIG. 9B

| PROOF SETTING INFORMATION |
|---|
| MAGENTA |
| LASER EMISSION INTENSITY ADJUSTMENT VALUE |
| CHARGE BIAS ADJUSTMENT VALUE |
| DEVELOPMENT BIAS ADJUSTMENT VALUE |
| TRANSFER BIAS ADJUSTMENT VALUE |
| LASER WRITING POSITION ADJUSTMENT VALUE (MAIN) |
| LASER WRITING POSITION ADJUSTMENT VALUE (SUB) |
| DEVICE PROFILE |
| 00 |
| 01 |
| 02 |
| 03 |
| 04 |
| 05 |
| ⋮ |
| ⋮ |
| FF |
| (AMOUNT OF RESIST ADJUSTMENT) |
| (AMOUNT OF OUT-OF-COLOR-REGISTRATION ADJUSTMENT) |

FIG. 9C

| PROOF SETTING INFORMATION |
|---|
| CYAN |
| LASER EMISSION INTENSITY ADJUSTMENT VALUE |
| CHARGE BIAS ADJUSTMENT VALUE |
| DEVELOPMENT BIAS ADJUSTMENT VALUE |
| TRANSFER BIAS ADJUSTMENT VALUE |
| LASER WRITING POSITION ADJUSTMENT VALUE (MAIN) |
| LASER WRITING POSITION ADJUSTMENT VALUE (SUB) |
| DEVICE PROFILE |
| 00 |
| 01 |
| 02 |
| 03 |
| 04 |
| 05 |
| ⋮ |
| ⋮ |
| FF |
| (AMOUNT OF RESIST ADJUSTMENT) |
| (AMOUNT OF OUT-OF-COLOR-REGISTRATION ADJUSTMENT) |

FIG. 9D

| PROOF SETTING INFORMATION |
|---|
| BLACK |
| LASER EMISSION INTENSITY ADJUSTMENT VALUE |
| CHARGE BIAS ADJUSTMENT VALUE |
| DEVELOPMENT BIAS ADJUSTMENT VALUE |
| TRANSFER BIAS ADJUSTMENT VALUE |
| LASER WRITING POSITION ADJUSTMENT VALUE (MAIN) |
| LASER WRITING POSITION ADJUSTMENT VALUE (SUB) |
| DEVICE PROFILE |
| 00 |
| 01 |
| 02 |
| 03 |
| 04 |
| 05 |
| ⋮ |
| FF |
| (AMOUNT OF RESIST ADJUSTMENT) |
| (AMOUNT OF OUT-OF-COLOR-REGISTRATION ADJUSTMENT) |

FIG. 12

| | PARAMETERS IN TAG | SETTING PARAMETERS IN PRINTING SYSTEM |
|---|---|---|
| PLATE-PRINT OUTPUTTING APPARATUS 4 | SHEET SIZE<br>LASER EMISSION INTENSITY ADJUSTMENT VALUE<br>DEVICE PROFILE | SIZE OF USED FILM<br>FILM EXPOSURE INTENSITY ADJUSTMENT VALUE<br>FILM EXPOSURE GAMMA TABLE |
| OFFSET PRINTING MACHINE 7 | SHEET TYPE<br>FIXING DEVICE TEMPERATURE<br>CHARGE BIAS ADJUSTMENT VALUE<br>DEVELOPMENT BIAS ADJUSTMENT VALUE<br>TRANSFER BIAS ADJUSTMENT VALUE | PRINTING SPEED<br>AMOUNT OF INK SUPPLY; AMOUNT OF WATER SUPPLY<br>AMOUNT OF INK SUPPLY<br>AMOUNT OF INK SUPPLY<br>AMOUNT OF INK SUPPLY |

IMAGE FORMING APPARATUS, CONTROL METHOD THEREFOR, CONTROL PROGRAM AND IMAGE FORMING SYSTEM

BACKGROUND OF THE INVENTION

1. Field of the Invention

The present invention relates to an image forming apparatus which enables easy management of proofs in a printing process, a control method therefor, a control program and an image forming system.

2. Description of the Related Art

In a conventional printing process such as a process by an offset printing machine, a picture of a printed matter is reproduced in desired gradation by printing a plurality of sample outputs for proofing (proofs) for which adjustment parameters have been variously adjusted by a sample-for-proofing printing machine called a proofer, for one image data received from a requester, such as PostScript data (a PS file), and adjusting the ink coating thickness based on color information about a proof selected from among the proofs (see Japanese Laid-Open Patent Publication (Kokai) No. 2002-326343).

In general, a color mark called a profiling target, which is created with a specified density parameter, is printed on a proof, and a computer calculates the value read from the color mark by a calorimeter or the like and creates a device profile to be a color adjustment basis for a printing machine. The color information described above corresponds to this device profile.

The adjustment parameters related to image formation by a proofer at the time when the proof is outputted are required in the case where the proof is reprinted or in the case where fine adjustment of proof output is performed again and again. The adjustment parameters are printed on a margin part of the proof or described on a printed matter physically different from the proof. The above-described profiling target is commonly written on a proof itself. In some cases, a multitude of profiling targets are written on margins of a proof. In other cases, a proof for confirming the profiling target is printed separately from a proof for confirming the reproductivity of image data.

In the above proofer, a considerable number of combinations of proofs for which color balance, basic color density and the like have been finely adjusted based on image data received from a requester are outputted at a time. A proof to be adopted is determined by comparing and reviewing them. Currently, a so-called ink jet printer or an electrophotographic printer is used as a proofer. Such a printer makes it possible to easily perform fine adjustment of parameters such as density, color balance and a gradation correction table, and therefore, a device profile to be adopted for printing is determined by outputting a multitude of proofs for which these parameters have been finely adjusted variously and comparing output results.

However, in the method in which printing is managed by printing adjustment parameters of a proofer on a sheet different from a proof, an input mistake of an adjustment parameter by a person easily occurs, and it is not easy to certainly associate a multitude of outputted proofs and a multitude of adjustment parameters with one another.

In the method in which adjustment parameters of a proofer are written on a margin, it cannot be strictly said that a proof and a final output matter are the same data if a setting information image, such as characters, put on the margin is considered, and there is therefore a problem that it is difficult to grasp the image of a final output matter.

Furthermore, when the adjustment parameters of a proofer are reset, it is necessary to input a multitude of adjustment parameters. Therefore, it is conceivable that an input mistake by a person similar to the above frequently occurs.

Furthermore, the method in which a profiling target for creation of a device profile is created on a margin of a proof has a problem that it is difficult to grasp the image of a final output matter because the appearance of the proof is not the same as the final printed matter.

In the method in which a proof for confirming a profiling target is printed separately from a proof for confirming the reproductivity of image data, the association relation between the proof for confirming the reproductivity of image data and the proof for confirming a profiling target tends to unclear, and there is therefore a problem that no means for ensuring that a profiling target corresponding to a desired proof has been certainly converted to a device profile for a printing machine exists.

Since there are a multitude of adjustment parameters of a proofer, and it requires skilled work and much work time to output a multitude of proofs by efficiently changing the settings. Further, since the adjustment parameters of a proofer or the device profile for printing machine described above include a multitude of parameters, the amount of data of a setting table or the like increases to collectively manage the parameters. Hereinafter, as more fine printing quality is required, it is required to efficiently manage the increasing data.

SUMMARY OF THE INVENTION

It is an object of the present invention to provide an image forming apparatus which enables easy management of proofs in a printing process, as well as a control method therefor, a control program and an image forming system.

To attain the above object, in a first aspect of the present invention, there is provided an image forming apparatus comprising an image inputting section that inputs image data for forming an image on a sheet having a data writable/readable IC tag, a transfer image generating section that generates a transfer image for forming the image on the sheet based on the inputted image data, an image formation conditions measuring section that measures image formation conditions of the transfer image, and an image formation conditions writing section that writes the measured image formation conditions into the IC tag.

According to the first aspect of the present invention, image formation conditions of a transfer image are measured, and the measured image formation conditions are written into an IC tag included in a sheet. Thereby, it is possible to easily perform management of proofs in a printing process.

Preferably, the transfer image generating section electrophotographically generates the transfer image.

Preferably, the image forming apparatus further comprises an intermediate transfer member, wherein the transfer image generating section generates the transfer image on the intermediate transfer member, and the image formation conditions measuring section measures image formation conditions of the transfer image which has been generated on the intermediate transfer member.

More preferably, the transfer image generating section generates mark images to be color criteria on the intermediate transfer member, and the image formation conditions measuring section measures the image formation conditions of the transfer image which has been generated on the intermediate transfer member by reading the mark images generated on the intermediate transfer member.

Preferably, the image formation conditions measuring section is at least one color sensor.

Preferably, the image formation conditions measuring section measures image formation conditions of an image obtained after the transfer image is transferred to the sheet and heat-fixed on the sheet.

Preferably, the image formation conditions measuring section measures at least one of laser emission intensity, voltage values related to charging, development and transfer, a position at which an image is formed, and a value of temperature for fixing the image data on the sheet.

To attain the above object, in a second aspect of the present invention, there is provided an image forming apparatus connectable to an information processing apparatus and a printing machine, the image forming apparatus comprising an image inputting section that inputs image data for forming an image on a sheet having a data writable/readable IC tag, a transfer image generating section that generates a transfer image for forming the image on the sheet based on the inputted image data, a transfer conditions reading section that reads transfer conditions of the transfer image, an adjustment parameter values inputting section that inputs the values of a plurality of adjustment parameters to be used when the image of the image data is formed, a sets-of-adjustment-parameters creating section that, by fluctuating the values of the plurality of the adjustment parameter values inputting section, automatically creates a plurality of sets of adjustment parameters, a control file creating section that creates a control file for controlling the printing machine based on the transfer conditions of the transfer image read by the transfer conditions reading section, and a writing section that writes a set of adjustment parameters and a control file corresponding to the image data for forming the image on the sheet, into an IC tag of the sheet.

According to the second aspect of the present invention, the set of adjustment parameters is automatically created by fluctuating the plurality of adjustment parameter values within the predetermined range, the control file for controlling the printing machine is created based on read transfer conditions of the transfer image, and the set of adjustment parameters and the control file are written into the IC tag. Thereby, it is possible to automate most of the conventional process in which output of a proof is repeatedly performed by adjusting parameters, and it is possible to easily perform management of proofs in a printing process because a combination of a proof and a control file corresponding to each other can be certainly obtained.

Preferably, the values of the plurality of adjustment parameters include a laser emission intensity adjustment value, voltage adjustment values related to charging, development and transfer, an adjustment value related to a position at which an image is formed, and a value of temperature for fixing the image data on the sheet.

Preferably, the image forming apparatus further comprises a forwarding section that forwards a set of adjustment parameters and a control file corresponding to the image data for forming the image on the sheet, to the information processing apparatus, wherein the writing section writes keyword information indicating the storage location where the set of adjustment parameters and the control file forwarded by the forwarding section are stored into the IC tag of the sheet.

More preferably, the IC tag includes a tag identifier, and the image forming apparatus comprises a downloading section that downloads the set of adjustment parameters and the control file from the information processing apparatus based on the keyword information written in the IC tag and the tag identifier.

More preferably, the keyword information includes at least one of a path, an access code and an IP address indicating the storage location in the information processing apparatus.

To attain the above object, in a third aspect of the present invention, there is provided an image forming system comprising a printing machine and an image forming apparatus, the image forming apparatus comprising an image inputting section that inputs image data for forming an image on a sheet having a data writable/readable IC tag, a transfer image generating section that generates a transfer image for forming the image on the sheet based on the inputted image data, a transfer conditions reading section that reads transfer conditions of the transfer image, an adjustment parameter values inputting section that inputs the values of a plurality of adjustment parameters to be used when the image of the image data is formed, a sets-of-adjustment-parameters creating section that, by fluctuating the values of the plurality of the adjustment parameters inputted by the adjustment parameter values inputting section, automatically creates a plurality of sets of adjustment parameters, a control file creating section that creates a control file for controlling the printing machine based on the transfer conditions of the transfer image read by the transfer conditions reading section, and a writing section that writes a set of adjustment parameters and a control file corresponding to the image data for forming the image on the sheet, into an IC tag of the sheet, and the printing machine comprising a receiving section that receives the set of adjustment parameters and the control file written in the IC tag, and a print executing section that executes printing based on the set of adjustment parameters and the control file received by the receiving section.

According to the third aspect of the present invention, the same advantage as in the above second aspect can be obtained.

To attain the above object, in a fourth aspect of the present invention, there is provided an image forming system comprising an information processing apparatus, a printing machine and an image forming apparatus, the image forming apparatus comprising an image inputting section that inputs image data for forming an image on a sheet having a data writable/readable IC tag including a tag identifier, a transfer image generating section that generates a transfer image for forming the image on the sheet based on the inputted image data, a transfer conditions reading section that reads transfer conditions of the transfer image, an adjustment parameter values inputting section that inputs the values of a plurality of adjustment parameters to be used when the image of the image data is formed, a sets-of-adjustment-parameters creating section that, by fluctuating the values of the plurality of the adjustment parameters inputted by the adjustment parameter values inputting section, automatically creates a plurality of sets of adjustment parameters, a control file creating section that creates a control file for controlling the printing machine based on the transfer conditions of the transfer image read by the transfer conditions reading section, a forwarding section that forwards a set of adjustment parameters and a control file corresponding to the image data for forming the image on the sheet to the information processing apparatus, and a writing section that writes keyword information indicating the storage location where the set of adjustment parameters and the control file forwarded by the forwarding section are stored into an IC tag of the sheet, and the printing machine comprising a receiving section that receives the keyword information written in the IC tag, a downloading section that downloads the set of adjustment parameters and the control file from the information processing apparatus based on the keyword information written in the IC tag and the tag identifier, and a print executing section that executes printing based on the set of adjustment parameters and the control file downloaded by the downloading section.

According to the fourth aspect of the present invention, the set of adjustment parameters and the control file are forwarded to an information processor, and keyword information indicating the storage location where the forwarded set of adjustment parameters and control file are stored is written into the IC tag. Thereby, the set of adjustment parameters and the control file can be downloaded from the information processing apparatus based on the keyword information and the tag identifier of the IC tag, and the same advantage as in the case of writing the set of adjustment parameters and the control file into the IC tag can be obtained.

To attain the above object, in a fifth aspect of the present invention, there is provided a control method for an image forming apparatus, comprising an image inputting step of inputting image data for forming an image on a sheet having a data writable/readable IC tag, a transfer image generation step of generating a transfer image for forming the image on the sheet based on the inputted image data, an image formation conditions measuring step of measuring image formation conditions of the transfer image, and an image formation conditions writing step of writing the measured image formation conditions into the IC tag.

To attain the above object, in a sixth aspect of the present invention, there is provided a control method for an image forming apparatus connectable to an information processing apparatus and a printing machine, the control method comprising an image inputting step of inputting image data for forming an image on a sheet having a data writable/readable IC tag, a transfer image generation step of generating a transfer image for forming the image on the sheet based on the inputted image data, a transfer conditions reading step of reading transfer conditions of the transfer image, an adjustment parameter values inputting step of inputting the values of a plurality of adjustment parameters to be used when the image of the image data is formed, a sets-of-adjustment-parameters creating step of, by fluctuating the values of the plurality of the adjustment parameters inputted in the adjustment parameter values inputting step, automatically creating a plurality of sets of adjustment parameters, a control file creation step of creating a control file for controlling the printing machine based on the transfer conditions of the transfer image read in the transfer conditions reading step, and a writing step of writing a set of adjustment parameters and a control file corresponding to the image data for forming the image on the sheet, into an IC tag of the sheet.

To attain the above object, in a seventh aspect of the present invention, there is provided a control program to be executed in an image forming apparatus, the control program comprising an image inputting module that inputs image data for forming an image on a sheet having a data writable/readable IC tag, a transfer image generating module that generates a transfer image for forming the image on the sheet based on the inputted image data, an image formation conditions measuring module that measures image formation conditions of the transfer image, and an image formation conditions writing module that writes the measured image formation conditions into the IC tag.

To attain the above object, in an eighth aspect of the present invention, there is provided a control program to be executed in an image forming apparatus connectable to an information processing apparatus and a printing machine, the control program comprising an image inputting module that inputs image data for forming an image on a sheet having a data writable/readable IC tag, a transfer image generating module that generates a transfer image for forming the image on the sheet based on the inputted image data, a transfer conditions reading module that reads transfer conditions of the transfer image, an adjustment parameter values inputting module that inputs the values of a plurality of adjustment parameters to be used when the image of the image data is formed, a sets-of-adjustment-parameters creating module that, by fluctuating the values of the plurality of the adjustment parameters inputted by the adjustment parameter values inputting module, automatically creates a plurality of sets of adjustment parameters, a control file creating module that creates a control file for controlling the printing machine based on the transfer conditions of the transfer image read by the transfer conditions reading module, and a writing module that writes a set of adjustment parameters and a control file corresponding to the image data for forming the image on the sheet, into an IC tag of the sheet.

The above and other objects, features, and advantages of the invention will become more apparent from the following detailed description taken in conjunction with the accompanying drawings.

BRIEF DESCRIPTION OF THE DRAWINGS

FIG. 8 is a configuration diagram of a read/write circuit provided for an RFID tag writing/reading unit.

FIG. 9 is a diagram showing the structure of data to be written into the RFID tag.

FIG. 12 is a diagram showing a table indicative of correspondence between parameters written in the RFID tag read by an RFID reader and setting parameters in a plate-printing machine and an offset printing machine.

DETAILED DESCRIPTION OF THE PREFERRED EMBODIMENTS

The present invention will now be described in detail with reference to the drawings showing a preferred embodiment thereof.

Figure 1:
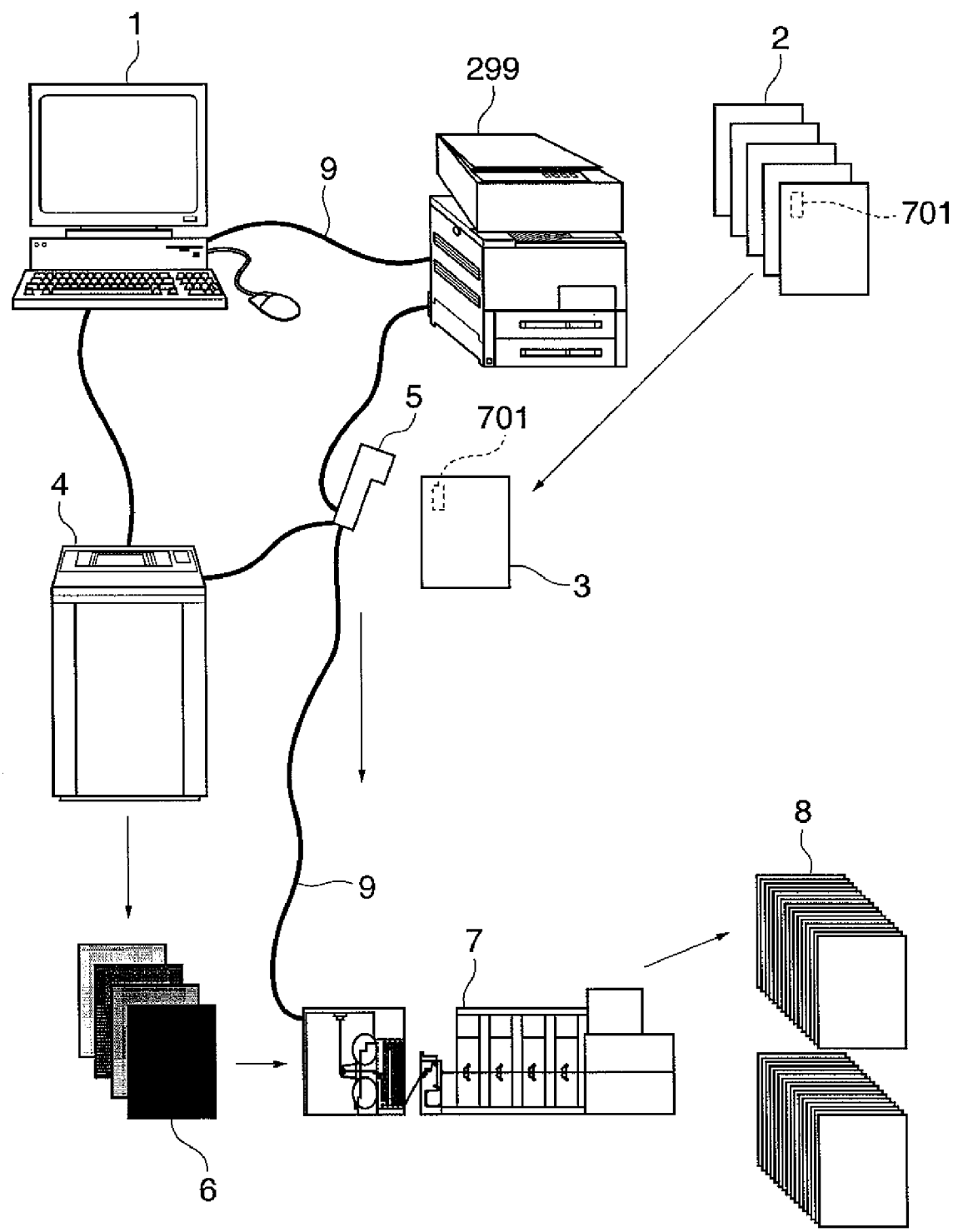
FIG. 1 is a diagram showing the configuration of an image forming system including an image forming apparatus according to an embodiment of the present invention.

FIG. 1 is a diagram showing the configuration of an image forming system including an image forming apparatus according to an embodiment of the present invention.

The image forming system in FIG. 1 is provided with a host computer (PC) 1, a multifunction apparatus 299 as an image forming apparatus, a plate-print outputting apparatus 4, an RFID reader 5 and an offset printing machine 7. These are connected with one another via a network 9.

The PC 1 stores data received from a requestor such as image data created in a page-description language such as PostScript or in bitmap.

The multifunction apparatus 299 is a color printer called a proofer for outputting a sample output for proofing (proof). By finely adjusting image formation parameters, the multifunction apparatus 299 creates a multitude of proofs 2 as described later. In addition to an electrophotographic printer, the proofer may be a printer with a different system such as an ink jet printer. A requester of received data (printing requester) can select one representative proof 3 with a desired color balance from among the multitude of proofs 2 to mass-print the same output.

An RFID tag 701 is embedded in each of the proofs 2. In the RFID tag 701, data of image formation conditions set when the proof 2 is outputted is stored.

An RFID reader 5 wirelessly reads the data stored in the RFID tag 701 embedded in the representative proof 3 and forwards the read data to the plate-print outputting apparatus 4.

Similarly, the data in the RFID tag 701 read by the RFID reader 5 is also forwarded to the multifunction apparatus 299 and the offset printing machine 7. By forwarding the data of image formation conditions to the multifunction apparatus 299, no missing image formation conditions occur, and the representative proof 3 can be easily reproduced at any time.

Meanwhile, the plate-print outputting apparatus 4 is an apparatus for outputting a plate 6 from a so-called PS (Post-Script) plate which is used for printing by the offset printing machine 7. The plate 6 is an aluminum plate and covered with a photosensitive film. By covering the photosensitive film side of a plate with negative film created based on image data from the PC 1 and dissolving the photosensitive film corresponding to a non-image area (a part which is not to be colored) by a development work of emitting ultraviolet rays, the plate-print outputting apparatus 4 creates the plate 6. The plate 6 of each color is attached to the offset printing machine 7.

The offset printing machine 7 makes print settings such as adjustment of the amount of ink supply based on a device profile to be described later, which is stored in the representative proof 3, and outputs a bundle of prints 8 in accordance with the print settings.

Figure 2:
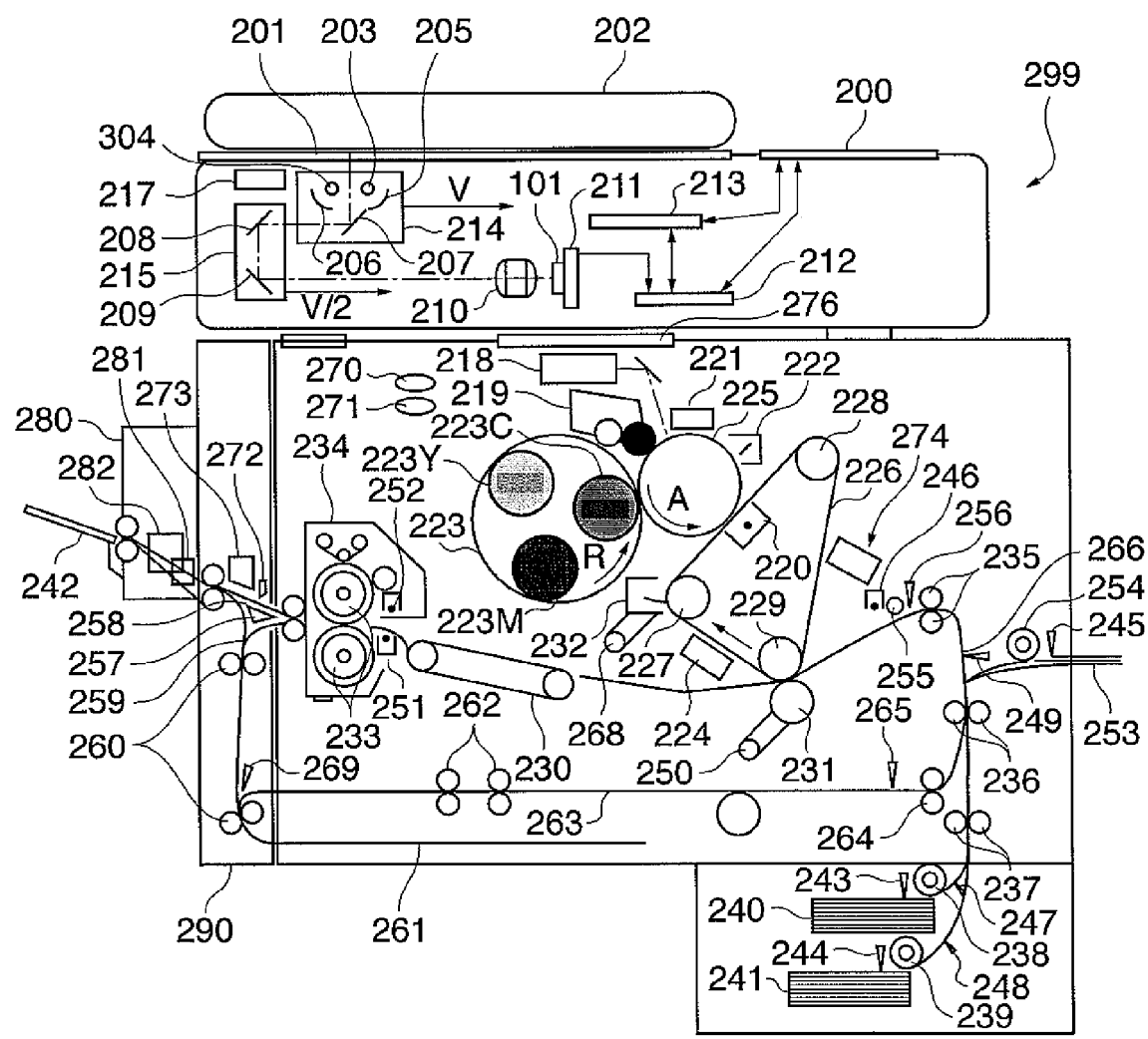
FIG. 2 is a diagram showing the entire configuration of a multifunction apparatus.

FIG. 2 is a diagram showing the entire configuration of the multifunction apparatus 299.

The multifunction apparatus 299 is provided with a reader unit 50 and a printer unit 51.

The configuration of the reader unit 50 will be described first.

The reader unit 50 is provided with a control board 200 for controlling the entire multifunction apparatus 299; a CCD 101; a substrate 211 on which the CCD 101 is implemented; a digital image processing unit 212; a document table glass (platen) 201; a document feeder (DF) 202 (a configuration is also possible in which a mirror-surface pressure plate, not shown, is attached instead of this document feeder 202); light sources (halogen lamps or fluorescent lamps) 203 and 204 for illuminating a document; reflection umbrellas 205 and 206 for focusing light from the light sources 203 and 204 onto a document; mirrors 207 to 209; a lens 210 for focusing light reflected or projected from a document onto the CCD 101; a carriage 214 which contains the halogen lamps 203 and 204, the reflection umbrellas 205 and 206, and the mirror 207; a carriage 215 which contains mirrors 208 and 209; and an external interface (I/F) 213 to other devices.

The carriages 214 and 215 scan (sub-scan) the entire surface of a document placed on the document table glass 201 by mechanically moving in a direction vertical to the electrical scanning (main scanning) direction of the CCD 101 at a speed V and at a speed V/2, respectively.

Figure 3:
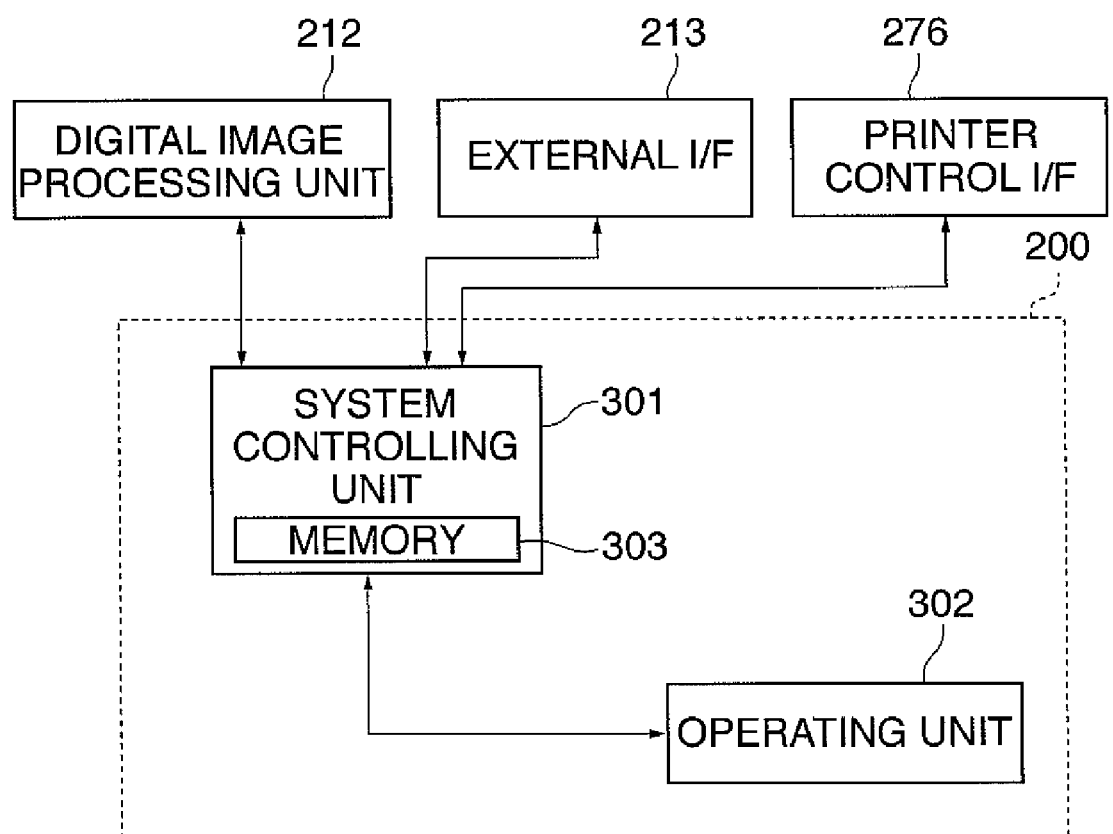
FIG. 3 is a diagram showing the schematic configuration of a control board.

As shown in FIG. 3, the control board 200 is configured by a system controlling unit 301 having an I/F for exchanging information for performing control with each of the digital image processing unit 212, the external I/F 213 and a printer control I/F 276, a memory 303 within the system controlling unit, and an operating unit 302. The operating unit 302 is configured by liquid crystal with a touch panel for an operator to input content of processing and for notifying the operator of information, warning and the like related to the processing.

Figure 4:
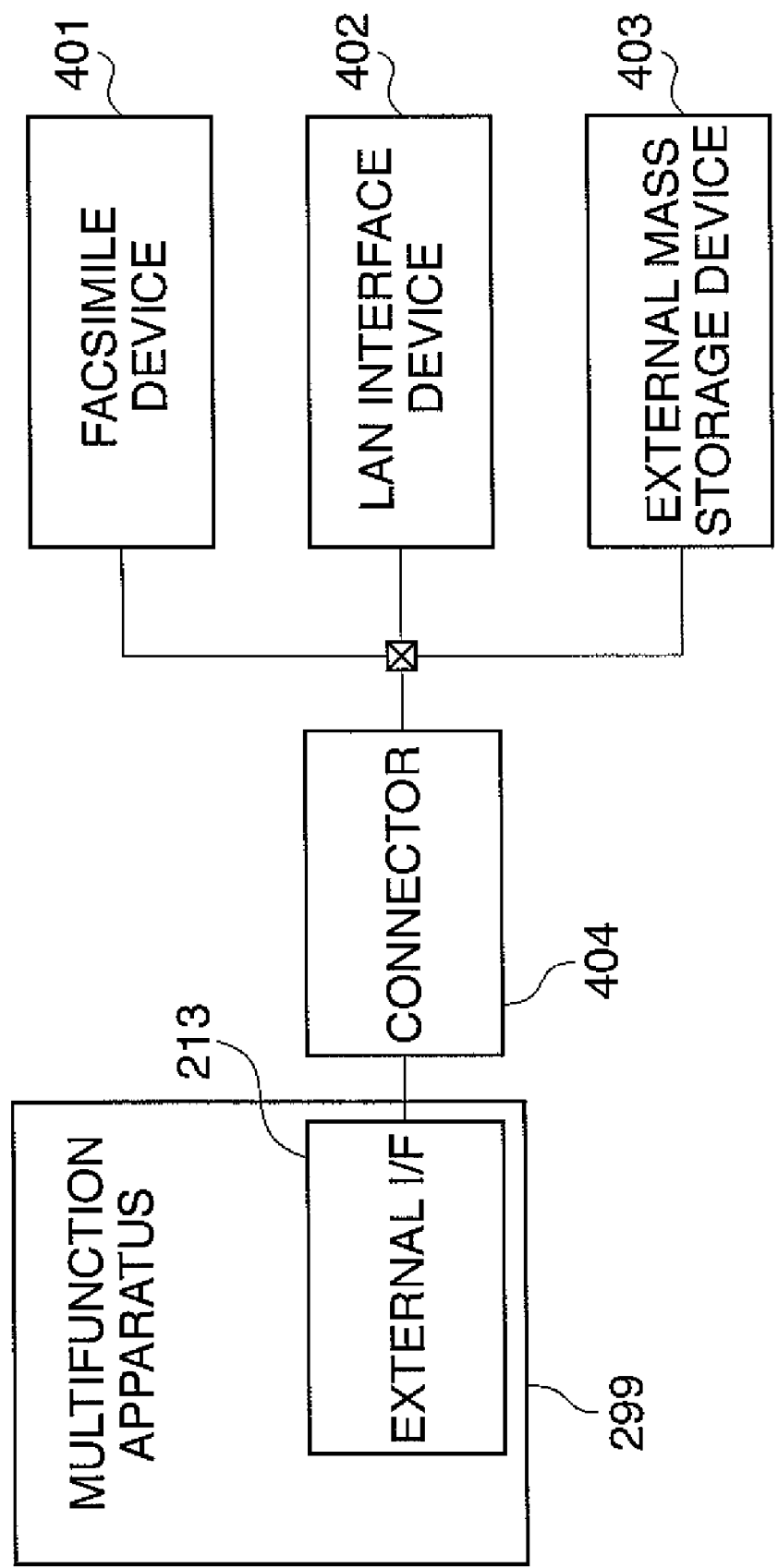
FIG. 4 is a diagram showing connection relation between the multifunction apparatus and external devices.

The external I/F 213 is an interface for sending and receiving image information or code information with external devices. Specifically, as shown in FIG. 4, the external I/F 213 connects to a facsimile device 401, a LAN interface device 402 and an external mass storage device 403 via a connector 404. Control of sending and receiving of image information or code information with the facsimile device 401, the LAN interface device 402 and the external mass storage device 403 is performed by mutual communication between the facsimile device 401, the LAN interface device 402 and the external mass storage device 403, and the system controlling unit 301 of the control board 200.

Next, the configuration of the printer portion 51 will be described.

In FIG. 2, a photosensitive body drum (hereinafter referred to simply as "photosensitive member") 225 as an image carrier is provided in a manner that it can be rotated by an image creation system motor, not shown, in the direction of an arrow A. Around the photosensitive member 225, there are arranged a primary charger 221, an exposing device 218 configured by a laser scanner, a black developing unit 219, a color developing unit 223, a transfer charger 220 and a cleaner device 222.

The black developing unit 219 is a development device for monochrome development, and develops a latent image on the photosensitive member 225 with toner of K (black). The color developing unit 223 is provided with three development devices 223Y, 223M and 223C for full-color development.

The development devices 223Y, 223M and 223C develop latent images on the photosensitive member 225 with toner of Y (yellow), M (magenta) and C (cyan), respectively. When performing development with toner of each color, the color developing unit 223 is rotated in the direction of an arrow R by a developer motor, not shown, so that the development device corresponding to a desired color is positioned to be contact with the photosensitive member 225.

The toner images of the respective colors developed on the photosensitive member 225 are sequentially transferred by the transfer charger 220 to a belt 226 as an intermediate transfer member so that the toner images of four colors are overlapped with one another. The belt 226 is stretched around rollers 227, 228 and 229. Among these rollers, the roller 227 functions as a driving roller coupled with an image creation system motor, not shown, to drive the belt 226. The roller 228 functions as a tension roller for adjusting the tension of the belt 226. The roller 229 functions as a backup roller of a transfer roller 231 as a secondary transfer device.

A transfer roller attaching/detaching unit 250 is a drive unit for contacting or releasing the transfer roller 231 to or from the belt 226. A belt cleaner 232 is provided at a position opposite to the roller 227 with the belt 226 located between them. A belt cleaner attaching/detaching unit 268 is a drive unit for contacting or releasing the belt cleaner 232 to and from the belt 226. By moving the belt cleaner 232 to the contact direction by the belt cleaner attaching/detaching unit 268, toner remaining on the belt 226 is scratched off by a blade.

Sheets stored in cassettes 240 and 241 and a manual paper feeding unit 253 are fed to a nip part, that is, a contact part between the transfer roller 231 and the belt 226 by a resist roller 255 and a group of paper feeding rollers 235, 236 and 237. Then, the transfer roller 231 is in contact with the belt 226. The resist roller 255 and the group of paper feeding rollers 235, 236 and 237 are rotatively driven by a paper feeding driving motor, not shown.

The toner images formed on the belt 226 are transferred onto a sheet at this nip part and heat-fixed by a fixing device 234. The sheet on which the toner images have been fixed is discharged to a paper discharging unit 290 by a fixing roller 233 which is rotatively driven by a fixation driving motor, not shown.

The paper discharging unit 290 is provided with an RFID tag writing/reading unit 273 for performing writing and reading of data between a paper discharge sensor 272 for detecting discharge of a sheet and an REFID tag included in the sheet.

The cassettes 240 and 241 and the manual paper feeding portion 253 have sheet detecting sensors 243, 244 and 245 for detecting existence of a sheet, respectively. The cassettes 240 and 241 and the manual paper feeding portion 253 also have paper feed sensors 247, 248 and 249 for detecting a trouble in pickup of a sheet, respectively.

A color sensor 274 is arranged near the belt 226. In FIG. 2, only one color sensor 274 is shown. Actually, however, four color sensors 274-1 to 274-4 are provided. The four color sensors 274-1 to 274-4 read the density of yellow, magenta, cyan and black of toner images created on the belt 226, respectively. Thereby, it is possible to detect the density of the toner images created on the intermediate transfer member.

In the multifunction apparatus 299 with the above configuration, image formation is executed as described below.

The sheets stored in the cassettes 240 and 241 and the manual paper feeding unit 253 are conveyed by pickup rollers 238, 239 and 254 onto a paper feeding path 266 one by one. When a sheet on the paper feeding path 266 is conveyed to the resist roller 255 by the group of paper feeding rollers 235, 236 and 237, the passage of the sheet is detected by a resist sensor 256 arranged immediately before the resist roller 255. When the passage of the sheet is detected by the resist sensor 256, the conveyance operation is temporarily terminated for a predetermined time period (for example, five seconds). As a result, the sheet knocks against the resist roller 255 which has stopped its rotation, and the conveyance is stopped. During this, however, correction of the conveyance direction of the paper feeding path is performed by re-arranging the sheet so that the front edge of the sheet in the traveling direction is vertical to the conveying path. This prevents the sheet from traveling in an oblique condition. This processing is referred to as paper feed resist elimination. The paper feed resist elimination is indispensable to minimize lean in the image forming direction for the sheet and the subsequent sheets. After the paper feed resist elimination, by activating the resist roller 255, the sheet is provided for the transfer roller 231.

Now, description will be made on a procedure for forming an image on the sheet provided for the transfer roller 231.

First, voltage is applied to the primary charger 221 to cause the surface of the photosensitive member 225 to be uniformly minus charged to a predetermined charged part potential. Then, exposure is performed by the exposing device 218 so that an image part on the charged photosensitive member 225 has a predetermined exposed part potential, and a latent image is formed. By being turned on/off based on an image signal, the exposing device 218 forms a latent image corresponding to an image.

Development biases preset for respective color are applied to the development rollers of the black developing unit 219 and the color developing unit 223, the latent image on the photosensitive member 225 is developed with toner when the latent image passes through the positions of the development rollers and visualized as toner images. The toner images are transferred to the belt 226 by the transfer charger 220, and further transferred to a conveyed sheet by the transfer roller 231. After that, the sheet is conveyed to the fixing device 234 via a fixation/conveyance belt 230.

In the fixing device 234, first, in order to supplement the adsorption of toner to prevent disturbance in the images, the toner images on the sheet are charged by pre-fixation chargers 251 and 252, and the toner images are further heat-fixed on the sheet by the fixing roller 233. After that, a discharging flapper 257 switches the conveying path to the side of the discharging path 258 and sends the sheet to a finisher unit 280.

Here, a sheet that does not require a post-processing process performed at the finisher unit 280 passes through the finisher unit 280 and is discharged to a discharge tray 242. In the case of a mode requiring a post-processing process, such as stapling, a predetermined number of sheets for which image formation has been completed are loaded in the finisher unit 280, a bundle of sheets is aligned by an alignment unit 281, and the adjusted bundle of sheets is stapled by a stapling unit 282 and discharged to the discharge tray 242.

In the case of executing full-color printing, after toners of four colors are overlapped with one another on the belt 226, toner images are transferred to a sheet.

Toner remaining on the photosensitive member 225 is charged to such a potential as makes it easy to clean the remaining toner by a spare cleaning device, not shown, and is removed and collected from the photosensitive member 225 by the cleaner device 222. After that, the electricity of the photosensitive member 225 is uniformly removed to be approximately zero volt by an electricity removal device, not shown, and the photosensitive member 225 is prepared for the next image forming processing.

The timing of image formation by the multifunction apparatus 299 is controlled with a predetermined position on the belt 226 as a reference. The belt 226 is stretched around the driving roller 227, the tension roller 228 and the backup roller 229 and is given a predetermined tension by the tension roller 228.

A reflection-type sensor 224 for detecting the reference position on the belt 226 is arranged between the driving roller 227 and the roller 229. The reflection-type sensor 224 detects a marking such as a reflection tape provided at the end of the outer peripheral surface of the belt 226 to output an I-top signal to a system controlling portion 300.

The ratio of the length of the outer periphery of the photosensitive member 225 and the perimeter length of the belt 226 can be indicated by an integer ratio of 1:n (n=integer). According to this setting, the photosensitive member 225 rotates n times while the belt 226 circulates once, and a gap between the reference position on the belt 226 and a corresponding position on the photosensitive member 225 is not caused. Accordingly, it is possible to avoid out of color registration due to ununiform rotation of the photosensitive member 225 caused while four colors are overlapped with one another on the belt 226 (while the belt circulates four times).

The system controlling portion 300 detects the I-top signal, and the exposing device 218 starts exposure after a lapse of a predetermined time. As described above, the photosensitive member 225 rotates n times while the belt 226 circulates once, and the belt 226 returns to the quite same condition as the condition before the circulation. Therefore, toner images are always formed at the same position on the belt 226. Though the size of a toner image changes depending on the size of a sheet, there is always an area where a toner image is never formed on the belt 226.

The length of the belt 226 may be a length that makes it possible to simultaneously form toner images corresponding to two images of a predetermined size. Thereby, since the time required for four circulation of the belt is sufficient as the time required for forming two color images created by overlapping four colors, productivity can be improved.

Now, description will be made on the operation performed in the case of forming an image on the back side of a sheet.

When an image is formed on the back side of a sheet, image formation on the front side of the sheet is performed first. The operation of image formation on the front side has been described hereinabove, and hence description thereof is omitted.

In the case of performing image formation on the back side, after toner images are heat-fixed on a sheet by the fixing device 234 in image formation on the front side, the conveying path is switched to the side of the back-side path 259 by the discharging flapper 257, and the sheet is once conveyed into a both-side reversing path 261 by a reverse roller 260 being rotatively driven in accordance with a timing of switch of the conveying path.

After that, the traveling direction of the sheet is switched by a both-side reversing path guide 269, and the sheet is conveyed to a both-side path 263 by the reversal roller 260 being reverse-rotatively driven and a both-side path conveyance roller 262 being driven, with an image side on which an image has been formed facing downward.

When the sheet is conveyed on the both-side path 263 toward a paper refeeding roller 264, the passage of the sheet is detected by a paper refeed sensor 265 located immediately before the paper refeeding roller 264. When the passage of the sheet is detected by the paper refeed sensor 265, the conveyance operation is temporarily terminated for a predetermined time period (for example, five seconds). As a result, the sheet knocks against the paper refeeding roller 264 which has stopped its rotation, and the conveyance is stopped. During this, however, correction of the conveyance direction of the paper refeeding path is performed for re-arranging the sheet so that the front end of the sheet in the traveling direction is vertical to the conveying path. This prevents the sheet from traveling in an oblique condition. This processing is referred to as paper refeed resist elimination. The paper refeed resist elimination is indispensable to minimize lean in the direction of image formation on the back side of the subsequent sheets. After the paper refeed resist elimination, the sheet is conveyed to the paper feeding path 266 again with the front side facing downward by activating the paper refeeding roller 264.

Since the subsequent image forming operation is similar to the image forming operation for the front side, description thereof is omitted. The conveying path is switched to the side of the discharging path 258 by the discharging flapper 257, and the sheet for which an image has been formed on both of the front and back sides is discharged to the paper discharging tray 235.

According to the operation as described above, in the multifunction apparatus 299, it is possible to automatically perform image formation on both sides of a sheet without an operator resetting the sheet with the front side facing downward.

Figure 5A:
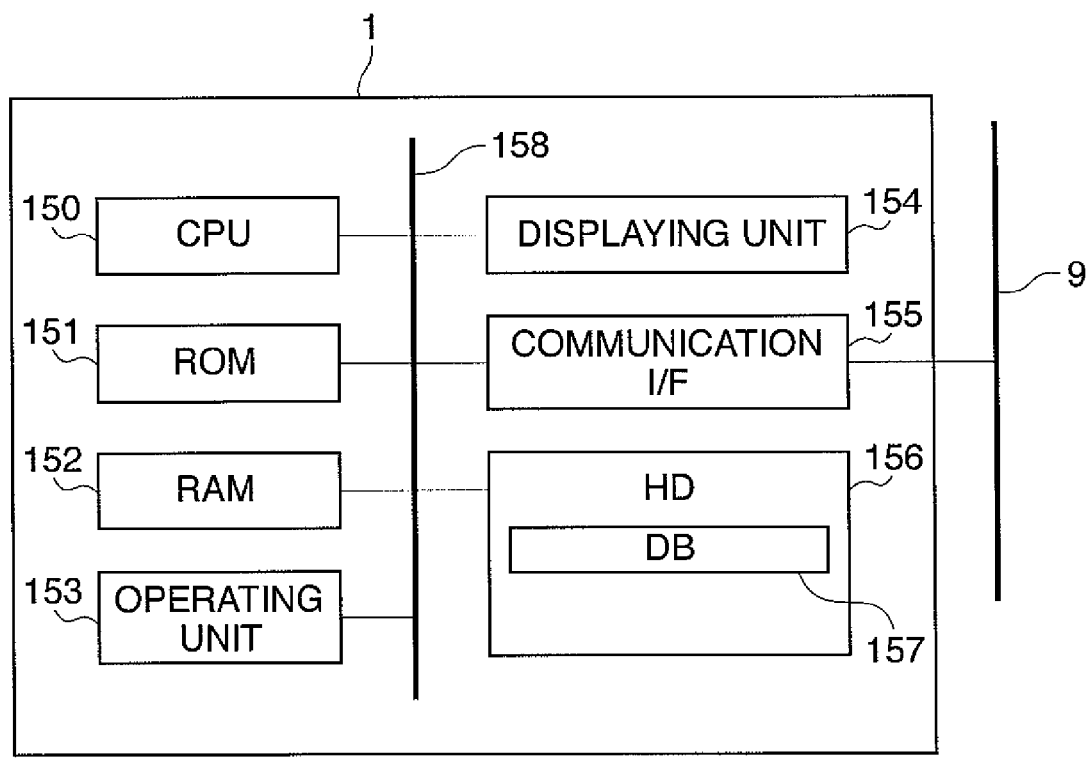
FIG. 5A is a block diagram showing the configuration of a PC.
Figure 5B:
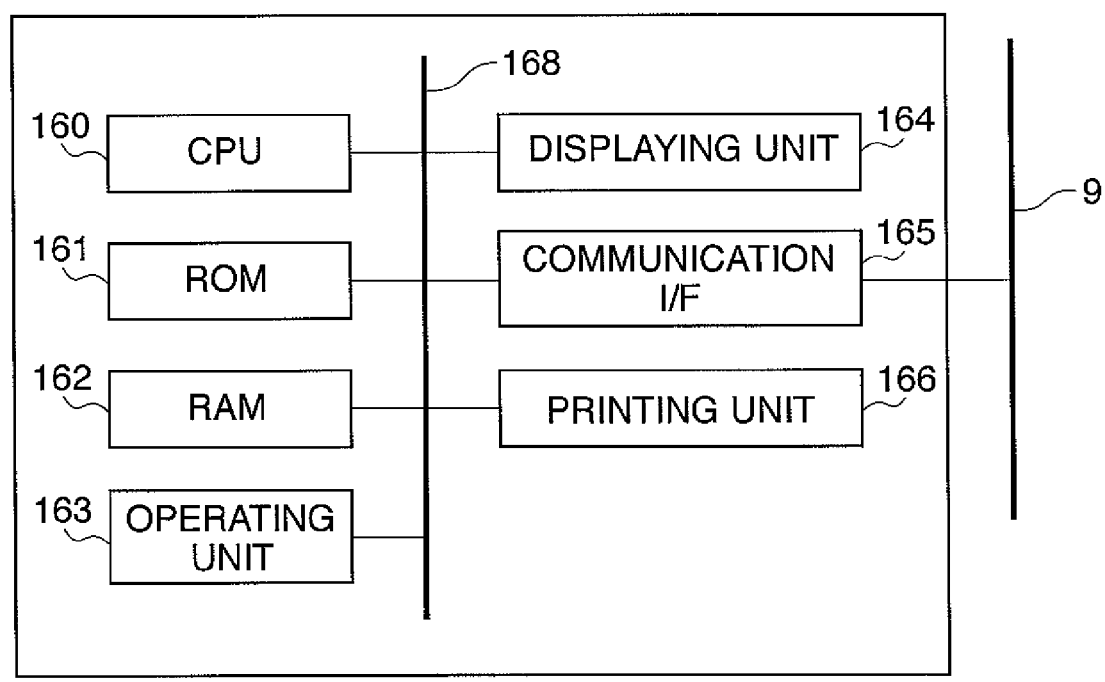
FIG. 5B is a block diagram showing the configuration of an offset printing machine.

FIG. 5A is a block diagram showing the configuration of the PC 1, and FIG. 5B is a block diagram showing the configuration of the offset printing machine 7.

In FIG. 5A, the PC 1 is provided with a CPU 150, a ROM 151, a RAM 152, an operating unit 153, a displaying unit 154, a communication I/F 155 and a hard disk (HD) 156. These are connected with one another via a system bus 158.

The CPU 150 mainly performs execution of programs. The ROM 151 is provided with a control program for controlling the PC 1, and the RAM 152 functions as a work area which temporarily stores data and the like. The operating unit 153 inputs various settings and instructions with the use of a keyboard, a mouse or the like. The displaying unit 154 displays a desired image, a warning screen and the like. The communication I/F 155 is connected to the network 9. The HD 156 is provided with a DB 157.

In FIG. 5B, the offset printing machine 7 is provided with a CPU 160, a ROM 161, a RAM 162, an operating unit 163, a displaying unit 164, a communication I/F 165 and a printing unit 166. These are connected with one another via a system bus 168.

The CPU 160 mainly performs execution of a control program (processing in FIG. 14 to be described later). The ROM 161 is provided with a control program for controlling the offset printing machine 7, and the RAM 162 functions as a work area which temporarily stores data and the like. The operating unit 163 inputs various settings or instructions with the use of an operator or the like. The displaying unit 164 displays a desired image, a warning screen and the like. The communication I/F 165 is connected to the network 9. The printing unit 166 executes offset printing.

Figure 6:
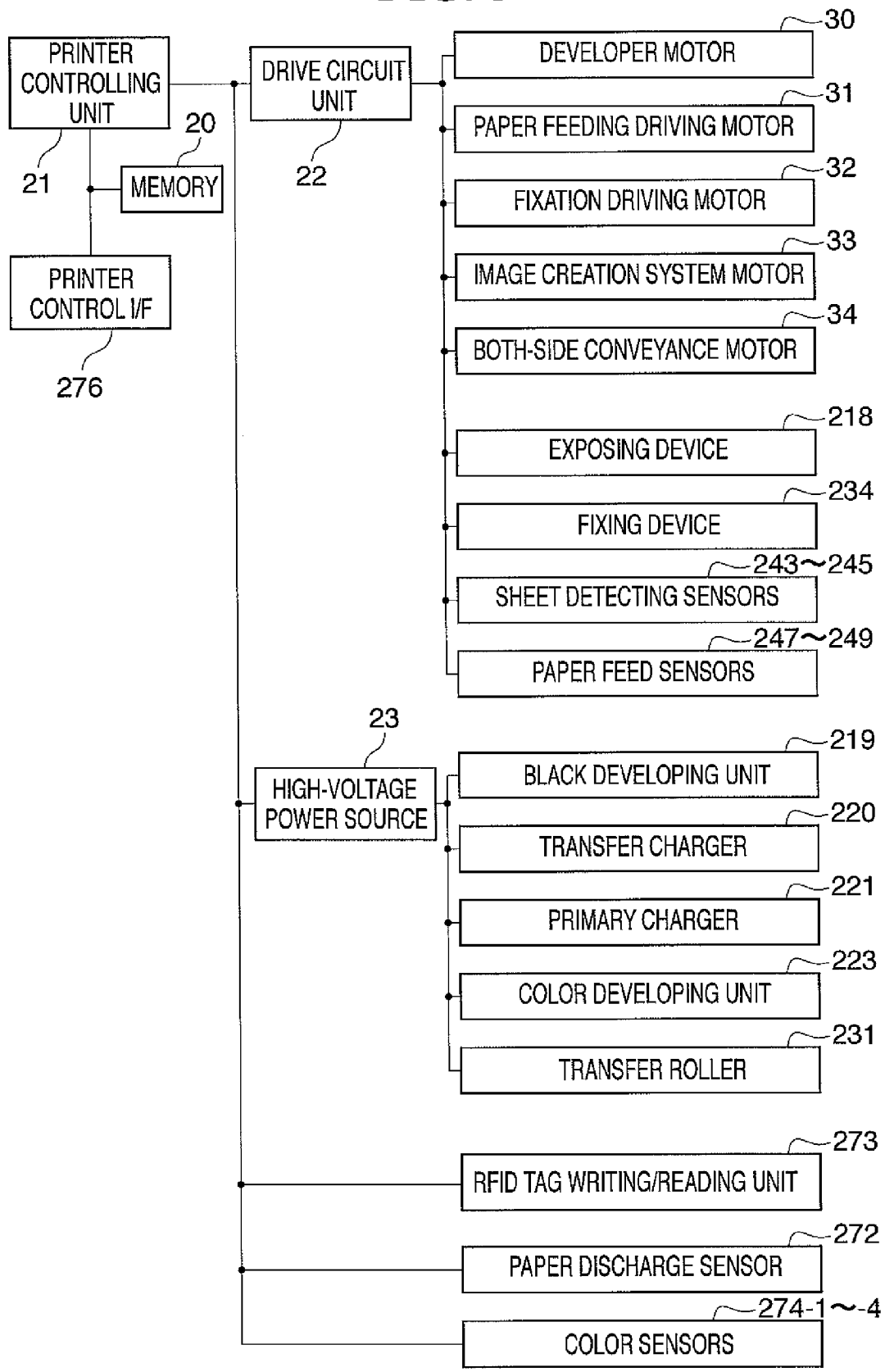
FIG. 6 is a block diagram showing the configuration of the control system of the multifunction apparatus.

FIG. 6 is a block diagram showing the configuration of the control system of the multifunction apparatus 299. The components similar to those in FIG. 2 are designated by identical reference numerals.

In FIG. 6, a printer controlling unit 21 is connected to a memory 20, the printer control I/F 276, a drive circuit unit 22, a high-voltage power source 23, the paper discharge sensor 272, the RFID tag writing/reading unit 273 and the color sensors 274-1 to 274-4.

The drive circuit portion 22 is connected to a developer motor 30 for rotatively driving the color developing unit 223; a paper feeding driving motor 31 for rotatively driving the resist roller 255 and the group of paper feeding rollers 235, 236 and 237; a fixation driving motor 32 for rotatively driving the fixing roller 233; an image creation system motor 33 to be coupled with the driving roller 227; a both-side conveyance motor 34 for rotatively driving the reverse roller 260 and the both-side path conveyance roller 262; the exposing device 218, the fixing device 234; the sheet detecting sensors 243, 244 and 245; and the paper feed sensors 247, 248 and 249.

The high-voltage power source 23 is connected to the black developing unit 219, the transfer charger 220, the primary charger 221, the color developing unit 223 and the transfer roller 231, and provides a power source to each unit.

The RFID tag writing/reading unit 273 is provided in the paper discharging unit 290 (FIG. 2) for discharging sheets. The RFID tag writing/reading unit 273 writes and reads data from and to an RFID tag included in a sheet. When the printer controlling unit 21 receives a signal indicating that a sheet is passing from the paper discharge sensor 272, the RFID tag writing/reading unit 273 starts processing for writing data into the RFID tag.

Figure 7:
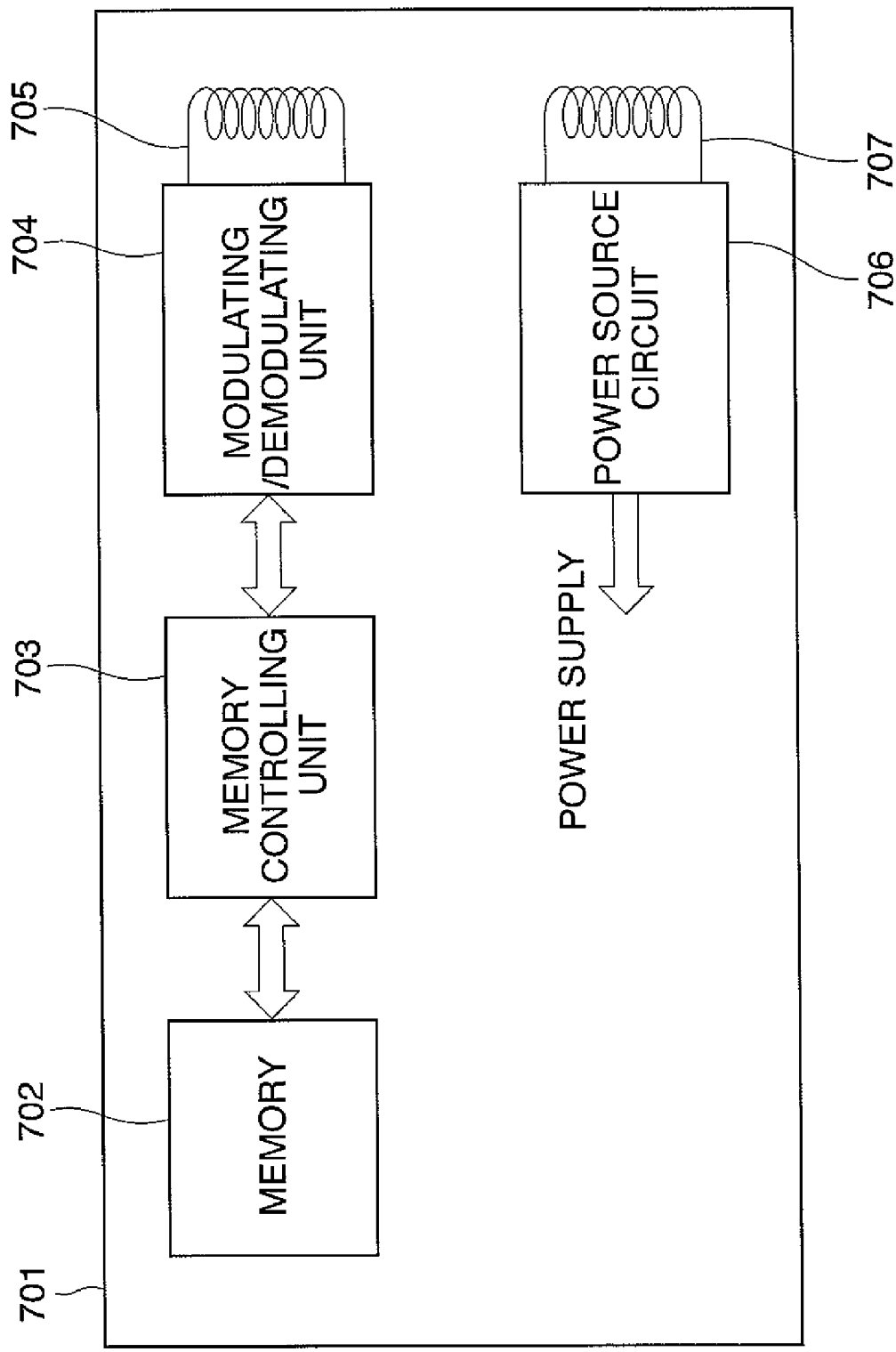
FIG. 7 is a diagram showing the configuration of an RFID tag.

FIG. 7 is a diagram showing the configuration of the RFID tag 701.

As shown in FIG. 7, the RFID tag 701 is provided with a memory 702, a memory controlling unit 703, a modulating/demodulating unit 704, a coil 705, a power source circuit 706 and a coil 707. The memory 702 is an EEPROM or the like in which data is not lost even when power is off. The memory 702 has addresses corresponding to its capacity, and a 16-bit data storage unit is configured for each address.

The memory controlling unit 703 writes and reads data sent from the RFID tag writing/reading unit 273 via the coil 705 and the modulating/demodulating unit 704 to and from the memory 702 in accordance with a command sent at the same time.

The power source circuit 706 provides power for the memory 702, the memory controlling unit 703 and the modulating/demodulating unit 704 by induced electromotive force from the coil 707 which has been generated by external electromagnetic induction.

FIG. 8 is a configuration diagram of the read/write circuit provided for the RFID tag writing/reading unit 273.

The read/write circuit is provided with an R/W coil 801. Both of transmission of power and sending/receiving of communication are performed with the use of electromagnetic waves (radio) constituted by power transmission waves and data communication modulation waves, between the R/W coil 801 and the coils 705 and 707 in FIG. 7. However, the power transmission waves and the data communication modulation waves may be sent via separate coils or antennas.

The power transmission waves are received by the coil 707 in FIG. 7, and they provide a power source for driving the REID tag 701.

The data communication modulation waves are sent and received by the coil 705 in FIG. 7 so that read/write access to the memory 702 is executed.

Furthermore, the read/write circuit is provided with a carrier signal generating circuit 802 for generating a carrier signal; an encoding circuit 803 for encoding data to be sent to the RFID tag 701; a modulator 804 for convoluting the carrier signal generated by the carrier signal generating circuit 802 with the data encoded by the encoding circuit 803 by amplitude modulation (amplitude shift keying modulation: ASK modulation); a sending amplifier 805 for amplifying the signal convoluted by the modulator 804; an inductance coupling unit 806 for coupling the signal amplified by the sending amplifier 805 with an aligning circuit (power supply circuit) 808; a capacitor 807; an inductance coupling unit 806; and the R/W coil 801. The read/write circuit is also provided with the aligning circuit (power supply circuit) 808 for preventing reflection of a signal sent to the RFID tag 701 and a signal received from the RFID tag 701; a filter circuit 809 for removing noise components of a signal received from the aligning circuit 808 via the inductance coupling unit 806; a receiving amplifier 810 for amplifying a signal obtained via the filter circuit 809; a demodulator 811 which ASK-demodulates (amplitude-shift-keying demodulates) the signal amplified by the receiving amplifier 810 with the carrier signal; and a decoding circuit 812 for decoding the signal demodulated by the demodulator 811 and outputting the demodulated signal to a data processing unit as received data.

The read/write circuit configured as described above ASK-modulates data to be sent from the data processing unit and sends it from the R/W coil 801 to the REFID tag 701 (write mode), or ASK-demodulates and receives data received from the R/W coil 801 (read mode).

FIG. 9 is a diagram showing the structure of data to be written into the RFID tag 701.

Commands for reading and writing data from and to the RFID tag 701 are identified as commands 10 and 01, respectively.

Each shaded cell in FIG. 9 shows a title indicating the kind of data, and each of the other cells shows each data (one data is 16-bit length data) fixedly assigned to the memory 702 of the RFID tag 701 though the address map, not shown.

The data is mainly classified into information common to respective color components which is called basic information, and setting information for respective colors having different setting parameters according to respective color planes. The basic information and the setting information for respective colors are stored in the memory 20 and are written into the RFID tag 701 at a predetermined timing.

As the basic information, there are stored tag IDs #0 to #2 assigned to respective RFID tags, manufacturer that produced the sheet, date, month and year of manufacture, the type of sheet indicating the type of the sheet, such as coated paper and Japanese paper, and sheet size information indicating a sheet size code. Since these data are unique to an RFID and a sheet, they are written into the RFID when the sheet is produced, and rewriting thereof is inhibited.

Furthermore, the print mode (e.g. character mode, photo mode and the like) of a proofer (e.g. the multifunction apparatus 299) set when a proof is outputted, a controlled temperature (controlled temperature for fixation) of the fixing device 234 during printing, and an average detection temperature (fixing device temperature) of the fixing roller 233 during printing the sheet are also recorded as the basic information. The reason for recording the controlled temperature (controlled temperature for fixation) of the fixing device 234 and the detection temperature (fixing device temperature) of the fixing roller 233 is that, because the controlled temperature of the fixing device 234 has influence on brilliance (so-called gloss) of a toner image on a sheet in electrophotography, it is necessary to store the temperature of the fixing roller 233 in order to reproduce a desired gloss.

Next, the setting information for respective colors will be described.

A laser emission intensity adjustment value is used to adjust the laser intensity of a laser to be emitted from the exposing device 218 to the photosensitive member 225 in each color. By finely adjusting the initial value of the laser intensity of the exposing device 218 using the laser emission intensity adjustment value, the printer controlling unit 21 adjusts the density of a latent image on the photosensitive member 225 and adjusts the density of the toner image of each color.

A charge bias adjustment value is used by the primary charger 221 to adjust a bias value to be applied to the photosensitive member 225 when an image of each color is created. The printer controlling unit 21 adjusts the density balance of toner images generated on the photosensitive member 225, by finely adjusting the initial value of the bias value applied to the photosensitive member 225 by the primary charger 221 with the use of the charge bias adjustment value.

A development bias adjustment value is used to adjust a development bias value to be applied to the black developing unit 219 and the color developing unit 223. The printer controlling unit 21 adjusts the density balance of toner images generated on the photosensitive member 225 by adjusting the initial value of the bias value applied to the black developing unit 219 and the color developing unit 223 with the use of the development bias adjustment value.

A transfer bias adjustment value is used to adjust a transfer bias value of the transfer charger 220. The printer controlling unit 21 adjusts conditions for transferring toner images from the photosensitive member 225 onto the belt 226 by adjusting the initial value of the transfer bias value of the transfer charger 220 with the use of the transfer bias adjustment value.

A laser writing position adjustment value (main) and a laser writing position adjustment value (sub) are used to adjust writing positions in the main scanning direction and the sub scanning direction of a laser to be emitted from the exposing device 218 to the photosensitive member 225 in each color. The printer controlling unit 21 adjusts the position of a latent image on the photosensitive member 225 to adjust the position of the toner image of each color by finely adjusting the initial values of the main-scanning-direction and sub-scanning-direction writing positions of a laser by the exposing device 218 with the use of the laser writing position adjustment value (main) and the laser writing position adjustment value (sub).

In this way, by adjusting various parameters, i.e., the laser emission intensity adjustment value, the charge bias adjustment value, the development bias adjustment value, the transfer bias adjustment value, the laser writing position adjustment value (main) and the laser writing position adjustment value (sub), output conditions for a proof to be outputted can be changed. These parameters can be set with the PC 1, and the RFID tag writing/reading unit 273 writes the parameters into the RFID tag 701 of a sheet to be outputted based on the parameters set with the PC 1. These parameters can also be set with the operating unit 302.

The positional relation between a sheet and an image (a so-called resist adjustment amount) shown when image formation is performed by the multifunction apparatus 299 may be stored in the RFID tag 701 and reflected on a sheet conveyance timing adjustment value for the offset printing machine 7. Furthermore, the positional relation of each color plane (a so-called amount of out-of-color-registration adjustment) shown when image formation is performed by the multifunction apparatus 299 may be stored in the RFID tag 701 and reflected on the adjustment value for the sheet conveyance timing among the respective color printing modules in the offset printing machine 7.

Next, description will be made on processing for creating a device profile at the same time when proof printing is performed.

Figure 10:
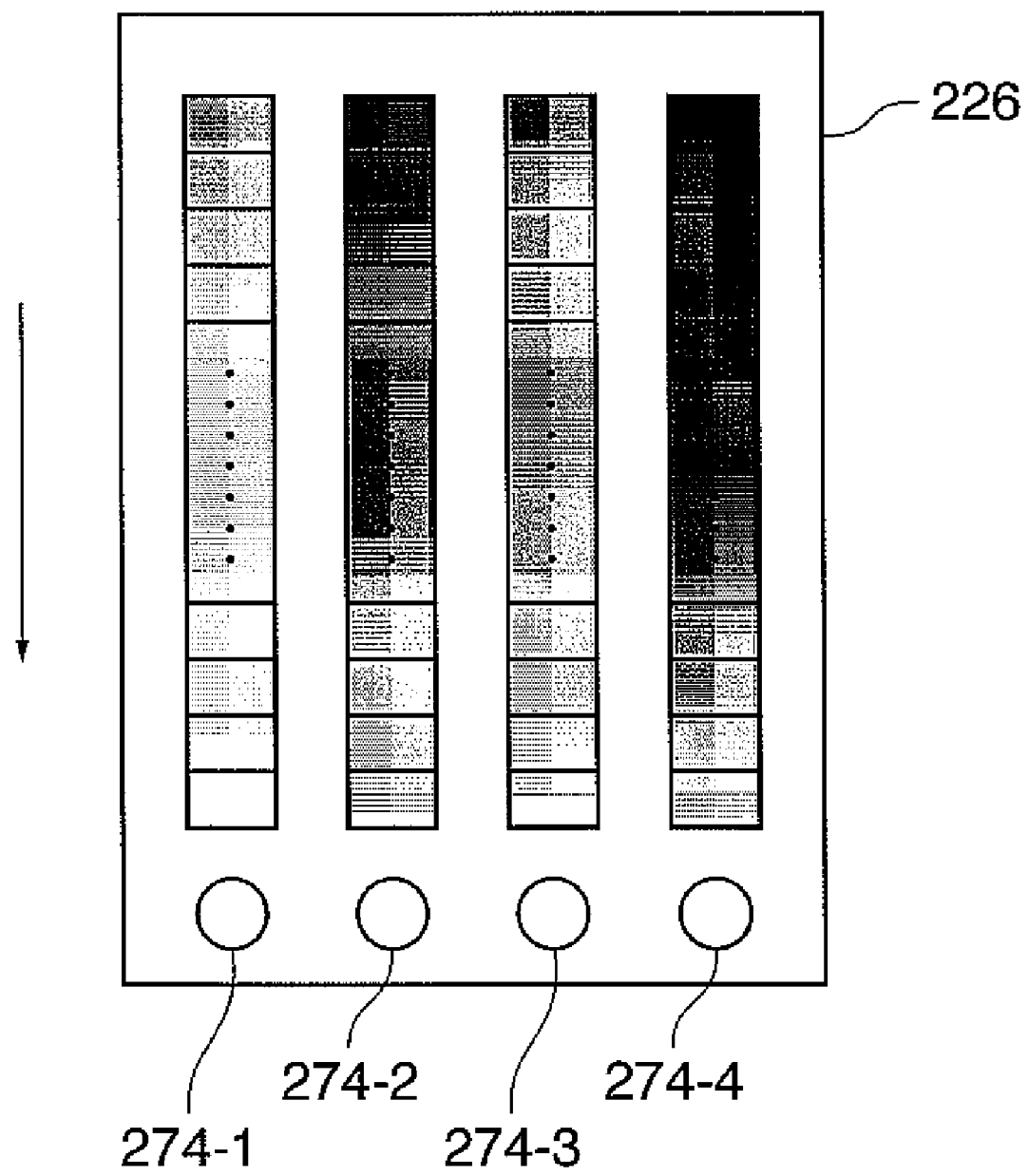
FIG. 10 is a diagram showing positional relations between color marks created on a belt and color sensors.

FIG. 10 is a diagram showing positional relations between color marks created on the belt 226 and the color sensors 274-1 to 274-4.

After creation of a proof, color marks of respective color components as shown in FIG. 10 are created on the belt 226 before the proof is discharged from the multifunction apparatus 299. The color marks are configured by an array with density gradually higher from upstream toward downstream, and configured in 256 gradation with the density "00" at the top and the density "255" at the bottom.

Each of the color sensors 274-1 to 274-4 performs sampling of the color mark along the circulation of the belt 226, and the printer controlling unit 21 creates color information (density information) based on the sampled color mark, stores it in the memory 20, and generates a device profile. The device profile created here is written into the RFID tag 701 by the RFID tag writing/reading unit 273 (see FIG. 9).

The device profile is a parameter which has been converted based on a standard color profile enabling even an apparatus having color characteristics different from the multifunction apparatus 299, such as the offset printing machine 7, to represent a desired color.

Figure 11:
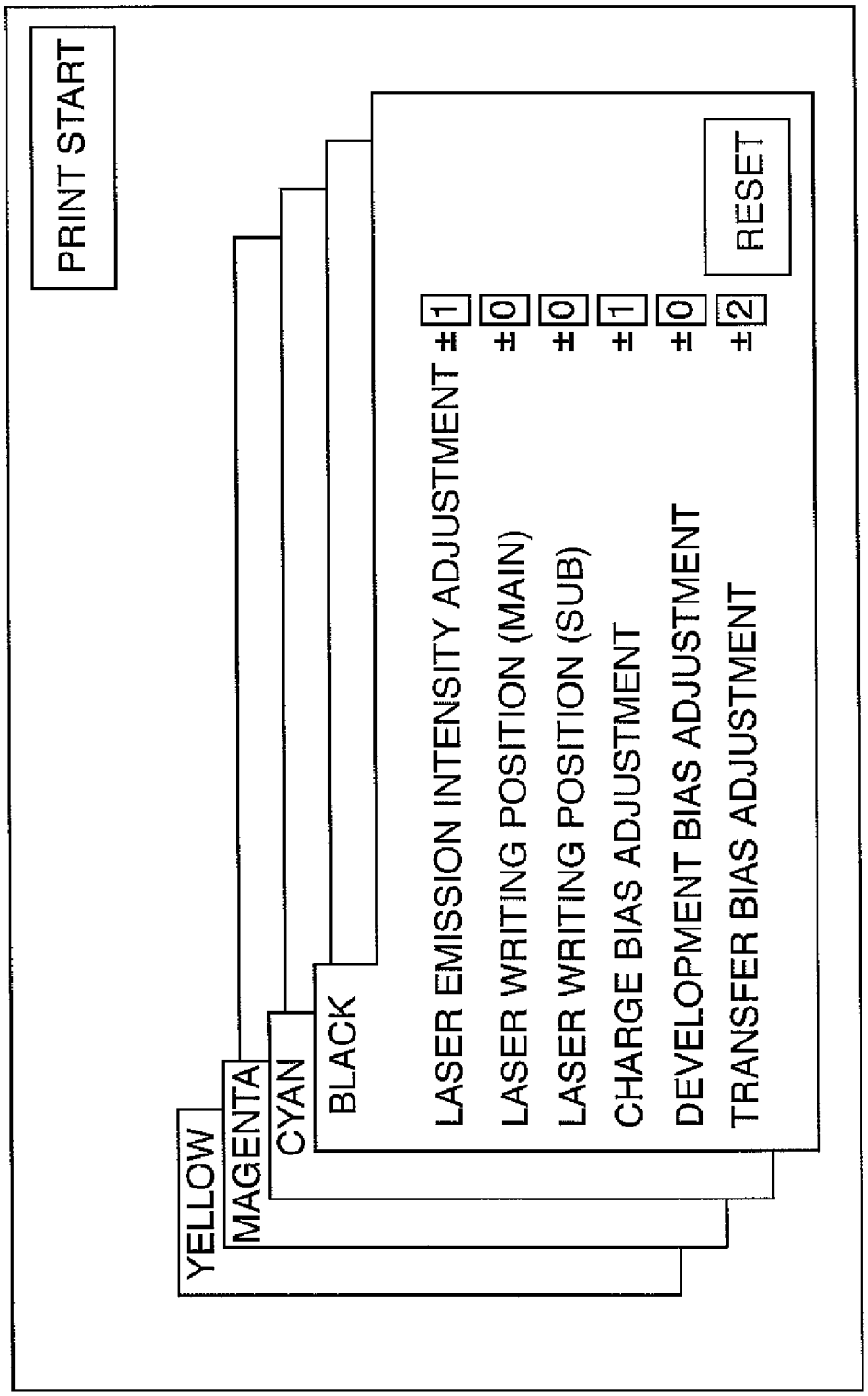
FIG. 11 is a diagram showing an example of a setting screen on the PC displayed when a proof is outputted with changed image formation conditions.

Next, FIG. 11 is a diagram showing an example of a setting screen on the PC 1 displayed when a proof is outputted with changed image formation conditions.

A setting screen for black is displayed at the top on the screen in FIG. 11. However, by switching the setting screen to setting screens for the other colors, the adjustment range of each color can be set.

In FIG. 11, since the laser emission intensity adjustment for black is set as ±1, the laser emission intensity can be adjusted in three ways, that is, −1, 0 and +1; the charge bias can be adjusted in three ways, that is, −1, 0 and +1; and the transfer bias can be adjusted in five ways, that is, −2, −1, 0, +1 and +2. Accordingly, adjustment only for black can be performed in 3×3×5=45 ways. The adjustment range is also set for yellow, magenta and cyan.

The adjustment values (adjustment parameters) set on the screen in FIG. 11 are outputted to the multifunction apparatus 299 after a print start key is pressed.

The printer controlling unit 21 of the multifunction apparatus 299 receives these adjustment values (adjustment parameters), automatically creates all the combinations of the adjustment parameters (sets of adjustment parameters) by multiplication of combinations, and executes output of proofs based on the created combinations of adjustment parameters (sets of adjustment parameters).

The PC 1 may display a warning on the setting screen when the number of outputted proofs exceeds a predetermined number. The warning may be notified by a voice or the like. Thereby, the number of outputted proofs can be reduced.

FIG. 12 is a diagram showing a table indicative of correspondence between parameters written in the RFID tag 701 to be read by the RFID reader 5 and setting parameters in the plate-print outputting apparatus 4 and the offset printing machine 7.

The sheet size in the RFID tag 701 is compared with the used film size which has been set in the plate-print outputting apparatus 4. If the sizes are different from each other, then the plate-print outputting apparatus 4 issues a warning, and thereby it is possible to avoid making a mistake of setting a film with a wrong size for the plate-print outputting apparatus 4.

The laser emission intensity adjustment value in the RFID tag 701 is converted to a film exposure intensity adjustment value of the plate-print outputting apparatus 4. The plate-print outputting apparatus 4 is provided with a laser emitting device for exposing a film, and the laser emission intensity adjustment value in the RFID tag 701 is converted by the following conversion formula (1) in consideration of device characteristics different from that of the exposing device 218 of the multifunction apparatus 299.

$$P\text{film} = P\text{proof} \times \alpha\text{laser} \tag{1}$$

Here, Pfilm denotes the film exposure intensity adjustment value of the plate-print outputting apparatus 4, and Pproof denotes the laser emission intensity adjustment value of the multifunction apparatus 299. Here, αlaser is a laser emission intensity conversion factor. Since the device characteristics of the plate-print outputting apparatus 4 and the multifunction apparatus 299 are different from each other, a work for determining the laser emission intensity conversion factor, such as measurement of laser output, is required between apparatuses. This determination work is performed at the initial implementation of the system or periodically.

The device profile in the RFID tag 701 is converted to a film exposure gamma table indicating exposure intensities at respective density levels in the plate-print outputting apparatus 4. At the same time, the device profile is forwarded as a parameter for determining, for the offset printing machine 7, the amount of ink supply for each color.

The above parameters of the sheet size, the laser emission intensity adjustment value and the device profile in the RFID tag 701 are read by the RFID reader 5 and inputted into the plate-print outputting apparatus 4, and then the conversion described above is executed in the plate-print outputting apparatus 4.

The type of sheet in the RFID tag 701, which indicates characteristics such as the type of paper, is forwarded to the offset printing machine 7 to determine the operation mode such as printing speed.

The fixing device temperature in the RFID tag 701 is converted to the amount of ink supply and the amount of water supply in the offset printing machine 7. The fixing device temperature in the RFID tag 701 determines the gloss of a sheet. In the offset printing machine 7, the gloss of a sheet is determined by the balance between the amount of ink supply and the amount of water supply.

The charge bias adjustment value, the development bias adjustment value and the transfer bias adjustment value in the RFID tag 701 are converted to the amount of ink supply in the offset printing machine 7. The charge bias adjustment value, the development bias adjustment value and the transfer bias adjustment value in the RFID tag 701 determine the density of an image to be formed on a sheet, and they correspond to the amount of ink supply in the offset printing machine 7.

The fixation temperature, the charge bias adjustment value, the development bias adjustment value and the transfer bias adjustment value in the RFID tag 701 are converted to the amount of ink supply and the amount of water supply in the offset printing machine 7 by the following conversion formulas (2) and (3).

$$D\text{water} = (P\text{temp} - P\text{std}) \times \alpha\text{water} \quad (2)$$

$$D\text{ink} = (P\text{temp} - P\text{std}) \times \alpha\text{pink} + C\text{bias} \times \alpha c\text{bias} + D\text{bias} \times \alpha d\text{bias} + T\text{bias} \times \alpha t\text{bias} \quad (3)$$

Here, Dwater denotes the amount of water supply; Ptemp denotes a fixing device temperature read from the RFID tag 701; Pstd denotes a standard fixing device temperature and αwater denotes a moisture adjustment amount conversion factor.

Dink denotes the amount of ink supply; αpink denotes an ink adjustment amount conversion factor corresponding to the fixation temperature; Cbias denotes the charge bias adjustment value; αcbias denotes an ink adjustment value conversion factor corresponding to the charge bias adjustment value; Dbias denotes the development bias adjustment value; αdbias denotes an ink adjustment value conversion factor corresponding to the development bias adjustment value; Tbias denotes the transfer bias adjustment value; and αtbias denotes an ink adjustment value conversion factor corresponding to the transfer bias adjustment value.

The above parameters of the type of sheet, the fixing device temperature, the charge bias adjustment value, the development bias adjustment value and the transfer bias adjustment value in the RFID tag 701 are read by the RFID reader 5 and inputted into the offset printing machine 7, and the conversion described above is executed in the offset printing machine 7.

Figure 13A:
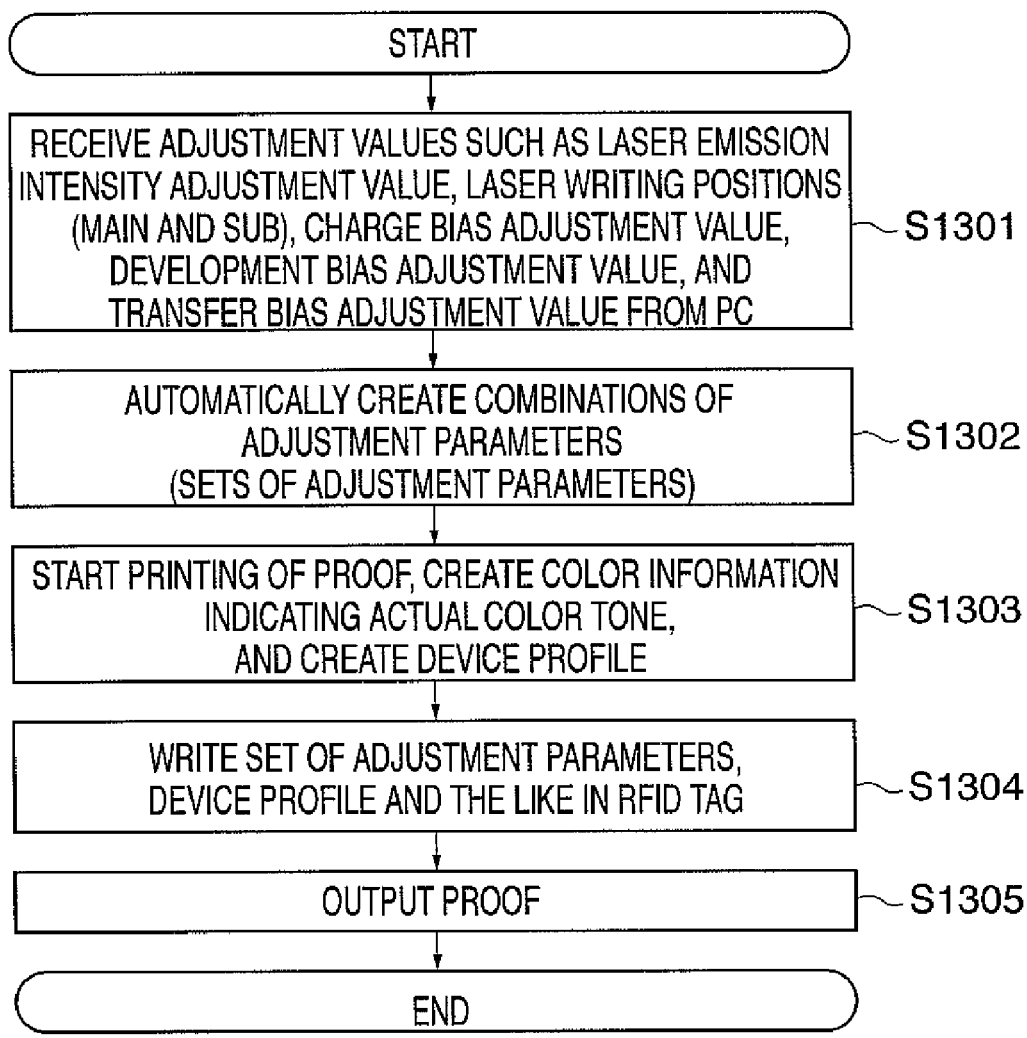
FIG. 13A is a flowchart showing processing executed by a printer controlling unit of the multifunction apparatus.
Figure 13B:
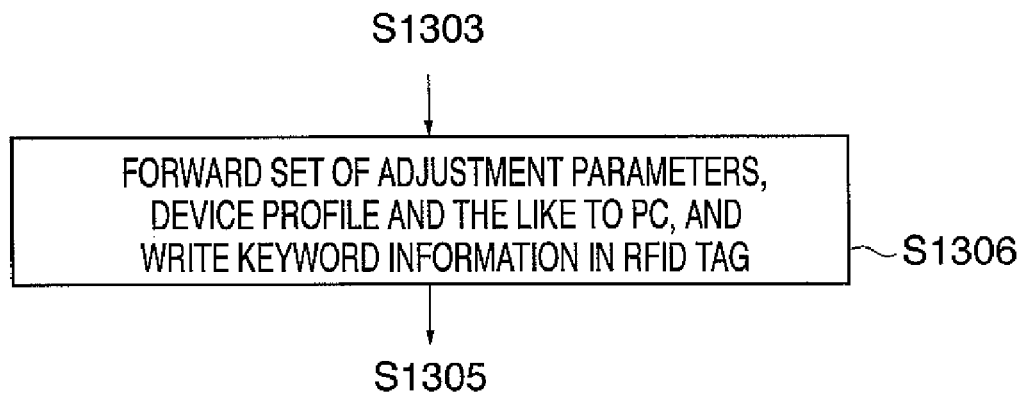
FIG. 13B is a flowchart showing a variation example of a part of the processing in FIG. 13A.

FIG. 13A is a flowchart showing processing executed by the printer controlling unit 21 of the multifunction apparatus 299, and FIG. 13B is a flowchart showing a variation example of a part of the processing.

First, adjustment parameters (that is, a laser emission intensity adjustment value, a charge bias adjustment value, a development bias adjustment value, a transfer bias adjustment value, a laser writing position adjustment value (main) and a laser writing position adjustment value (sub)) are received from the PC 1 (step S1301), and combinations of the adjustment parameters (sets of adjustment parameters) are automatically created (step S1302).

Then, printing of proofs is started based on the automatically created sets of adjustment parameters. Sampling of color marks on the belt 226 read by the color sensors 274-1 to 274-4 is performed. Based on the sampled color marks, color information (density information) is created and stored in the memory 20, and a device profile is generated (step S1303).

Next, a corresponding set of adjustment parameters, a corresponding device file and the like are written into the RFID tag 701 (step S1304), and a proof is outputted (step S1305). Then, the processing ends.

Instead of the above step S1304, it is also possible to forward the set of adjustment parameters, the device file and the like created in the steps S1302 and S1303 to the PC 1, and write the path to the storage location of the set of adjustment parameters, the device file and the like of PC 1, and the access code or the IP address (keyword information) of the DB 157 into the RFID tag 701 (step S1306). In this case, the printer controlling unit 21 can download the set of adjustment parameters, the device file and the like from the PC 1 based on the tag ID and the keyword information in the RFID tag 701.

In the step S1304, the color information created in the step S1303 may be written into the RFID tag 701, in addition to the set of adjustment parameters or the device profile.

Figure 14A:
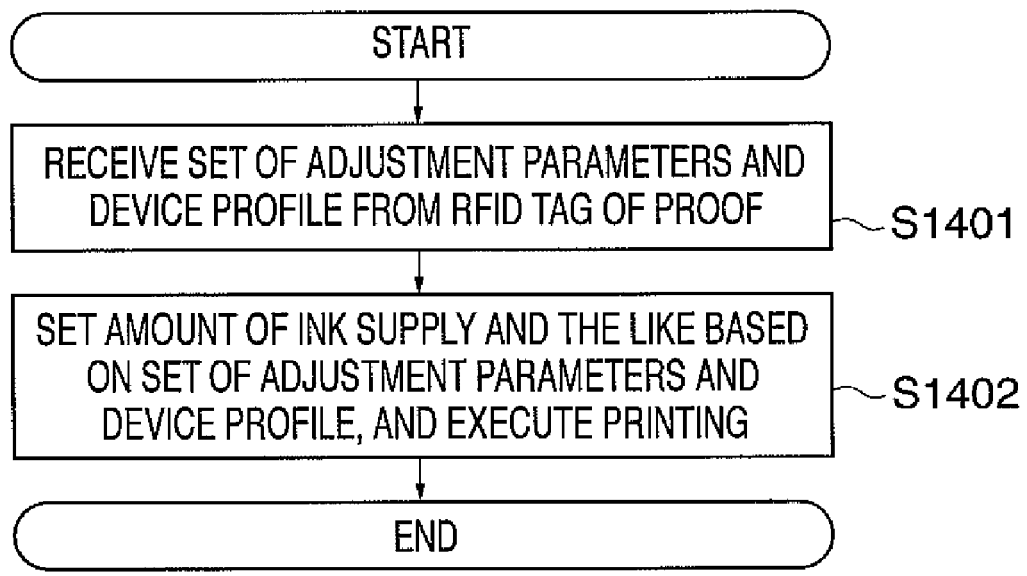
FIG. 14A is a flowchart showing processing executed by the offset printing machine.
Figure 14B:
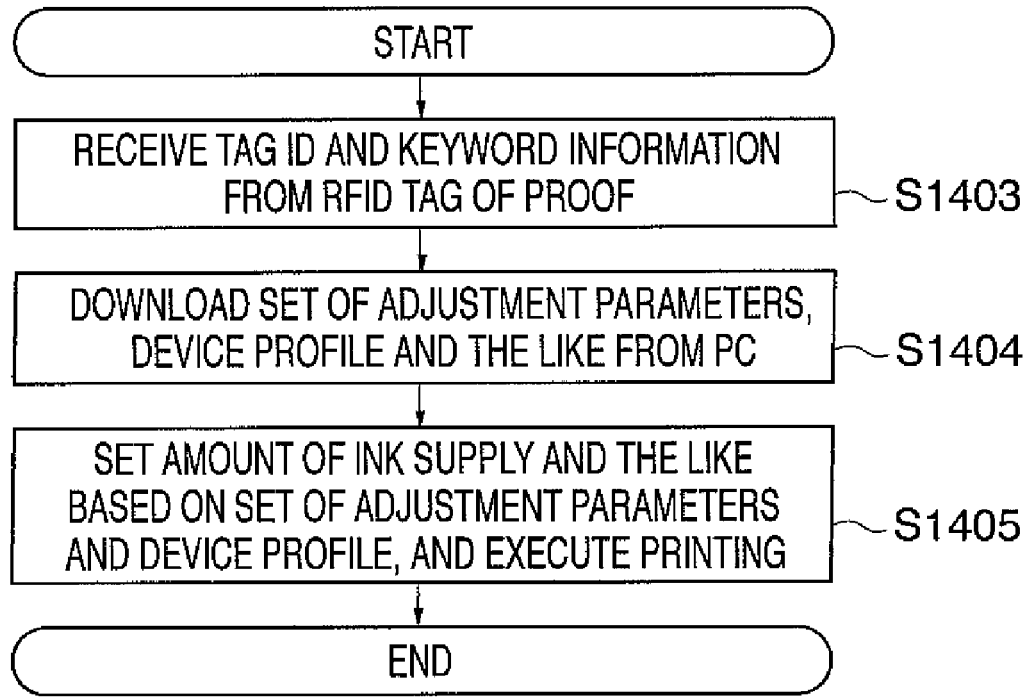
FIG. 14B is a flowchart showing a variation example of the processing in FIG. 14A.

FIG. 14A is a flowchart showing processing executed by the offset printing machine 7, and FIG. 14B is a flowchart showing the variation example thereof. These processings are mainly executed by the CPU 160 based on a control program stored in the ROM 161.

In FIG. 14A, first, the set of adjustment parameters, the device file and the like in the RFID tag 701 embedded in a proof outputted by the processing in FIG. 13A, which have been read by the RFID reader 5, are received (step S1401) The amount of ink supply and the like are set based on the set of adjustment parameters, the device file and the like which have been received, and offset printing is executed (step S1402). Then, the processing ends.

In FIG. 14B, first, the tag ID and the keyword information in the RFID tag 701 embedded in the proof outputted by the processing in FIG. 13B, which have been read by the REFID reader 5, are received (step S1403). Then, based on the received tag ID and keyword information, the set of adjustment parameters, the device file and the like are downloaded from the PC 1 (step S1404). The amount of ink supply and the like are set based on the set of adjustment parameters, the device file and the like which have been downloaded, and offset printing is executed (step S1405). Then, the processing ends.

According to the processings in FIG. 13B and FIG. 14B, even when all of the set of adjustment parameters, the device file and the like are not written into the memory 702 of the RFID tag 701, the multifunction apparatus 299 or the offset printing machine 7 can download the set of adjustment parameters, the device file and the like from the PC 1, and thereby, desired settings can be easily made.

As described above, according to this embodiment, sampling of color marks on the belt 226 is performed, and color information (density information) is created based on the actual sampled color marks and written into the RFID tag 701. Thereby, it is possible to easily perform management of proofs in a printing process.

Furthermore, a set of adjustment parameters is automatically created by fluctuating multiple adjustment parameter values within a predetermined range, a device profile is created based on sampled color marks, and then the set of adjustment parameters and the device profile are written into the RFID tag 701. Thereby, it is possible to automate most of the conventional process in which output of a proof is repeatedly performed by adjusting parameters, and it is possible to easily perform management of proofs in a printing process because a proof and a device profile which are combined correspond to each other certainly.

Furthermore, it is also possible to forward the set of adjustment parameters or the device file which have been created to the PC 1, and write the path to the storage location of the set of adjustment parameters or the device file in the PC 1 and the access code or the IP address (keyword information) of the DB 157 into the RFID tag 701. As a result, the multifunction apparatus 299 or the offset printing machine 7 can download the set of adjustment parameters, the device file and the like from the PC 1 based on the tag ID and the keyword information in the RFID tag 701, and the same advantage as the case of writing the set of adjustment parameters and the device profile into the RFID tag 701 can be obtained.

Though a device profile is created by reading toner images on the belt 226 in this embodiment, it is desirable to read a profile target (color marks) printed on a sheet in order to strictly create a device profile. In this case, a sheet on which a profile target (color marks) is printed out is printed immediately before printing each proof, and the sheet is read by a color sensor different from the color sensors 274-1 to 274-4 and provided at a different position inside the multifunction apparatus 299. A device profile calculated based on the value read by the color sensor is written into the RFID tag provided for the proof.

Furthermore, though adjustment parameters, a device file and the like in the RFID tag 701 are read by the RFID reader 5 in this embodiment, it is also possible that the RFID tag writing/reading unit 273 for reading the adjustment parameters, the device file and the like in the RFID tag 701 is provided for the multifunction apparatus 299 or the offset printing machine 7, and the RFID reader 5 is not used.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and function.

This application claims the benefit of Japanese Patent Application No. 2005-266994 filed Sep. 14, 2005, which is hereby incorporated by reference herein in its entirety.

What is claimed is:

1. An image forming apparatus comprising:
   an image inputting section that inputs image data formed on a sheet having a data writable/readable IC tag;
   a setting section that causes a user to set an adjustment range of image formation conditions for image forming on the sheet based on the image data input by the image inputting section;
   an image forming section that forms images on a plurality of sheets having the IC tag, by fluctuating the image forming conditions within an adjustment range set by the setting section; and
   an image formation conditions writing section that writes the image formation conditions used for image forming on the sheet into the IC tag on the sheet with images formed by the image forming section.

2. An image forming apparatus according to claim 1, wherein said image forming section electrophotographically forms the image.

3. An image forming apparatus according to claim 1, further comprising an image forming conditions measuring section that measures the image forming conditions and an intermediate transfer member, wherein said image formation conditions measuring section measures image formation conditions of the image formed on the intermediate transfer member.

4. An image forming apparatus according to claim 3, wherein said image forming section forms mark images to be color criteria on the intermediate transfer member, and said image formation conditions measuring section measures the image formation conditions of the image which has been formed on the intermediate transfer member by reading the mark images formed on the intermediate transfer member.

5. An image forming apparatus according to claim 3, wherein said image formation conditions measuring section is at least one color sensor.

6. An image forming apparatus according to claim 3, wherein said image formation conditions measuring section measures image formation conditions of an image obtained after the image is transferred to the sheet and heat-fixed on the sheet.

7. An image forming apparatus according to claim 1, wherein said image formation conditions measuring section measures at least one of laser emission intensity, image forming position, a value of fixation temperature, or voltage values related to charging, development, and transfer.

8. An image forming system comprising:
a printing machine; and
an image forming apparatus,
wherein the image forming apparatus comprises:
an image inputting section that inputs image data formed on a sheet having a data writable/readable IC tag;
a setting section that causes a user to set an adjustment range of image formation conditions for image forming on the sheet based on the image data input by the image inputting section;
an image forming section that forms images on a plurality of sheets having the IC tag, by fluctuating the image forming conditions within an adjustment range set by the setting section; and
an image formation conditions writing section that writes the image formation conditions used for image forming on the sheet into the IC tag on the sheet with images formed by the image forming section, and
wherein said printing machine comprises:
a receiving section that receives the set of adjustment parameters and the control file written in the IC tag; and
a print executing section that executes printing based on the set of adjustment parameters and the control file received by said receiving section.

9. A control method for an image forming apparatus comprising an image inputting section, a setting section, an image forming section, and an image formation conditions writing section, the method comprising:
an image inputting step of inputting image data, via the image inputting section, formed on a sheet having a data writable/readable IC tag;
a setting step of setting a user to set an adjustment range of image formation conditions for image forming on the sheet based on the image data input in the image inputting step;
an image forming step of forming images on a plurality of sheets having the IC tag, by fluctuating the image formation conditions within an adjustment range set in the setting step; and
an image formation conditions writing step of writing the image formation conditions used for image forming on the sheet into the IC tag on the sheet with images formed in the image forming step, with the image formation condition writing section.

10. A computer-readable medium storing a control program for controlling an image forming apparatus, the control program comprising:
an image inputting module that inputs image data formed on a sheet having a data writable/readable IC tag;
a setting module that causes a user to set an adjustment range of image formation conditions for image forming on the sheet based on the image data input by the image inputting module;
an image forming module that forms images on a plurality of sheets having the IC tag, by fluctuating the image forming conditions within an adjustment range set in the setting module; and
an image formation conditions writing module that writes the image formation conditions used for image forming on the sheet into the IC tag on the sheet with images formed by the image forming module.

* * * * *